(12) United States Patent
Shinkawa et al.

(10) Patent No.: US 6,477,116 B1
(45) Date of Patent: Nov. 5, 2002

(54) ROTATION CONTROLLER AND ROTATION CONTROL METHOD

(75) Inventors: Osamu Shinkawa, Suwa; Tomio Ikegami, Chino; Kunio Koike, Matsumoto, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/308,749

(22) PCT Filed: Sep. 30, 1998

(86) PCT No.: PCT/JP98/04394

§ 371 (c)(1),
(2), (4) Date: Jun. 23, 1999

(87) PCT Pub. No.: WO99/17171

PCT Pub. Date: Apr. 8, 1999

(30) Foreign Application Priority Data

Sep. 30, 1997 (JP) .............................................. 9-265204
Feb. 6, 1998 (JP) .......................................... 10-026205

(51) Int. Cl.$^7$ .................................................. G04F 5/00
(52) U.S. Cl. ...................................................... 368/157
(58) Field of Search ................................ 368/155–157, 368/160

(56) References Cited

U.S. PATENT DOCUMENTS

| 3,628,114 A | 12/1971 | Pattantyus | 318/175 |
| 4,123,779 A | 10/1978 | Goldschmidt | 318/314 |
| 4,193,020 A | 3/1980 | Song | 318/314 |
| 4,381,478 A | 4/1983 | Saijo et al. | 318/135 |
| 5,517,469 A | 5/1996 | Wiget | |
| 5,615,178 A | 3/1997 | Takakura et al. | |
| 5,699,322 A | 12/1997 | Born | |
| 5,740,131 A | 4/1998 | Bernasconi | |
| 5,751,666 A | 5/1998 | Farine et al. | |

FOREIGN PATENT DOCUMENTS

| EP | 0 239 820 | 10/1987 |
| JP | 49-84680 | 8/1974 |
| JP | 58-168398 | 11/1983 |
| JP | 7-119812 | 12/1995 |
| JP | 8-36072 | 2/1996 |
| JP | 8-101284 | 4/1996 |
| JP | 9-182305 | 7/1997 |
| JP | 10-48355 | 2/1998 |
| JP | 10-82870 | 3/1998 |

*Primary Examiner*—Bernard Roskoski

(57) ABSTRACT

The present invention provides a rotation controller adjusting the speed of a rotary member (103). Phase difference compensating means (118) outputs a phase difference compensating signal (119) corresponding to a phase difference between a rotation signal of the rotary member (103) and a target signal, and frequency difference compensating means (114) outputs a frequency difference compensating signal (115) corresponding to a frequency difference between these signals. The rotary member (103) is braking-controlled by means of these signals. Use of the phase difference compensating signal (119) permits achievement of PLL control, and maintenance within the locking range allows a stable rotation control with a high response. Further, use of the frequency difference compensating signal (115) makes it possible to quickly bring the control within the locking range even when the rotary member (103) deviates from the target signal, and thus to carry out a control with a high response even upon riseup of the rotary member (103).

22 Claims, 22 Drawing Sheets

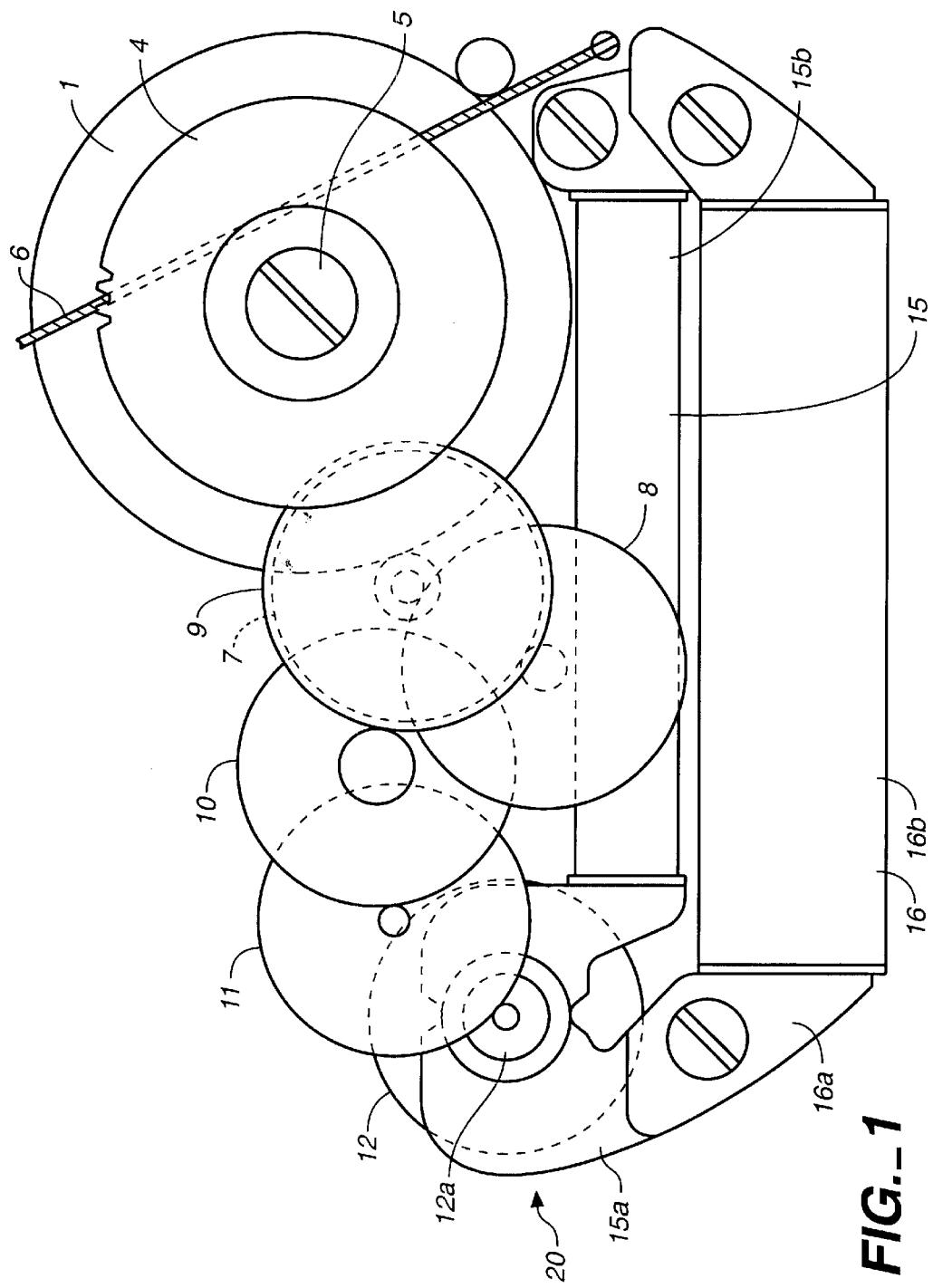
FIG._1

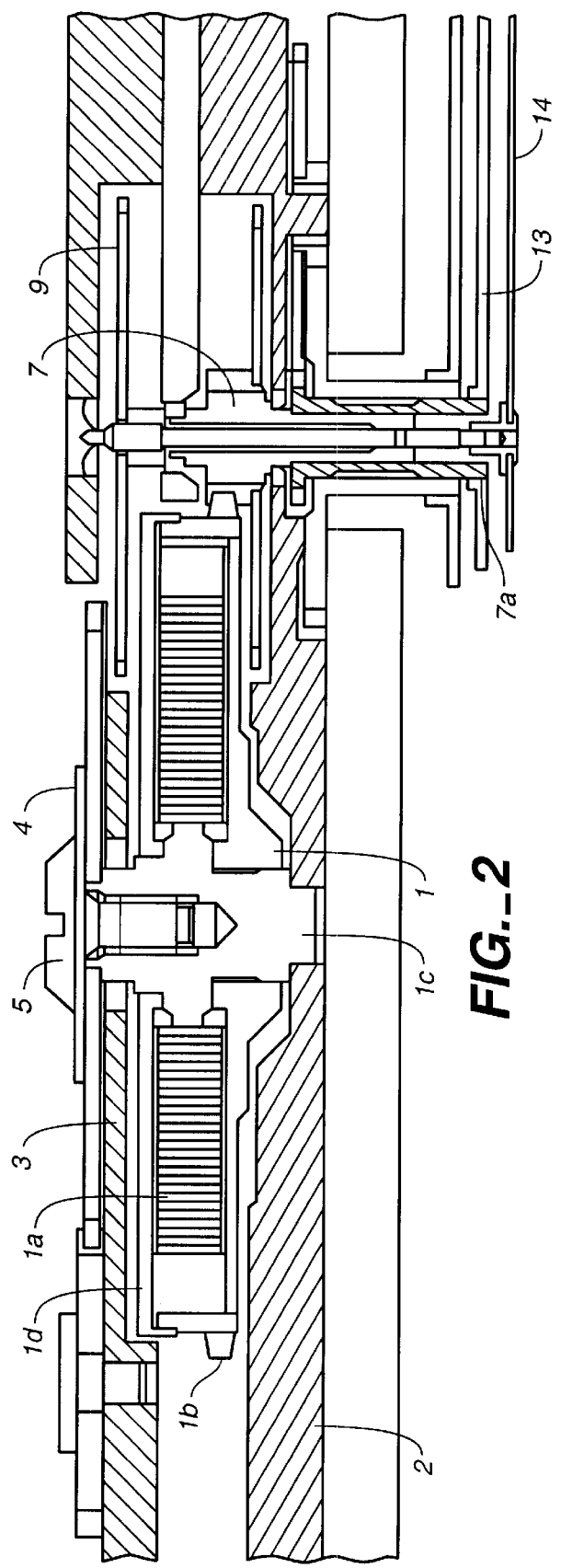
FIG._2

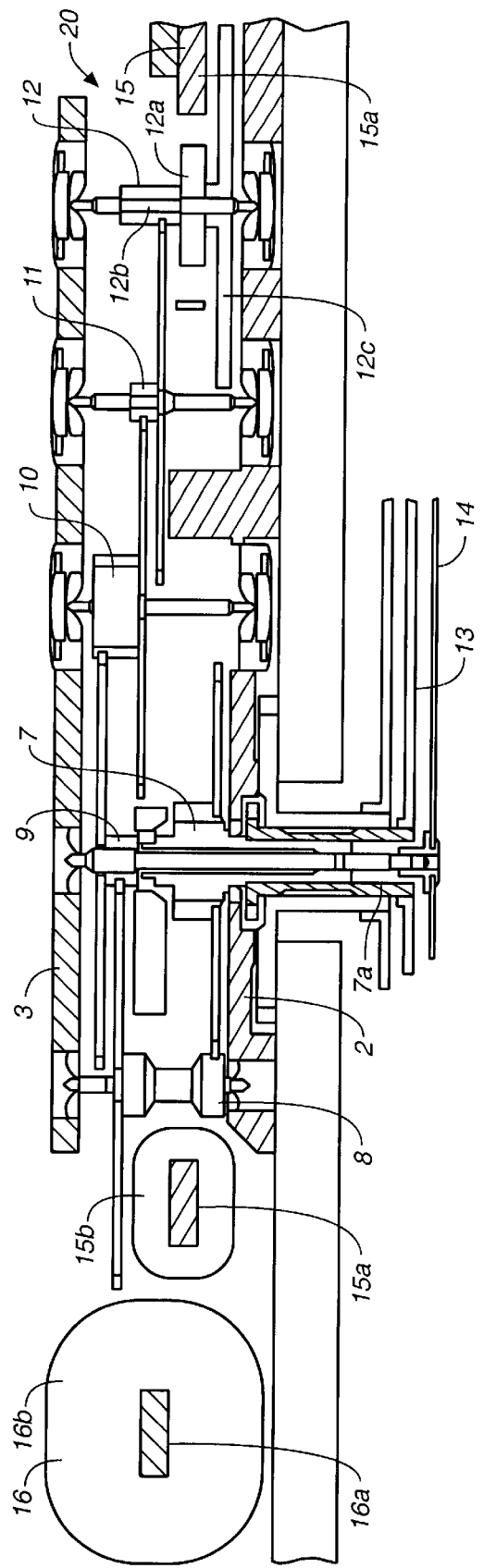
FIG._3

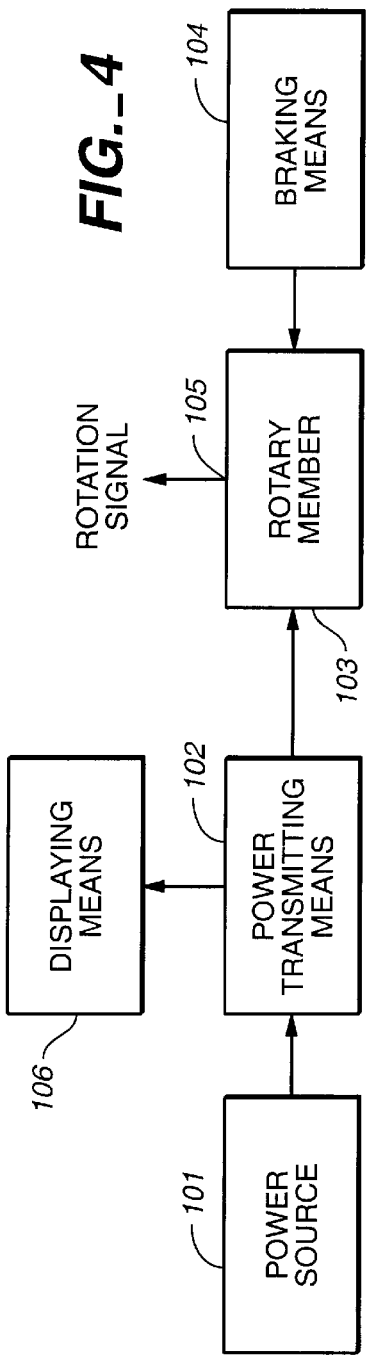
FIG._4
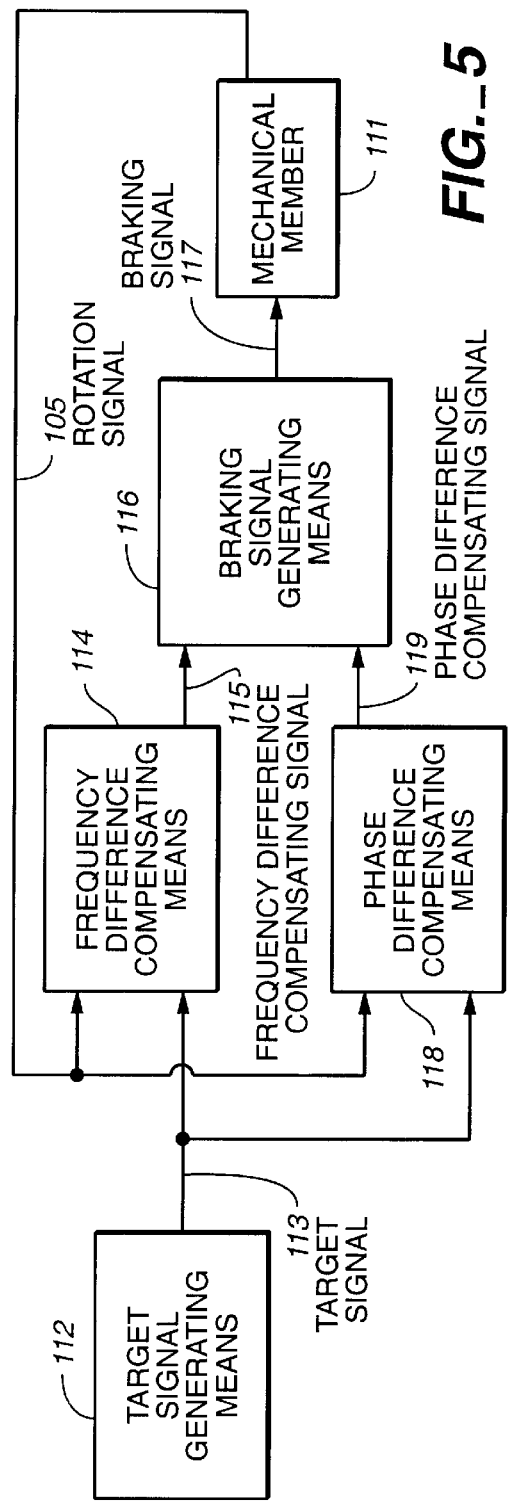
FIG._5

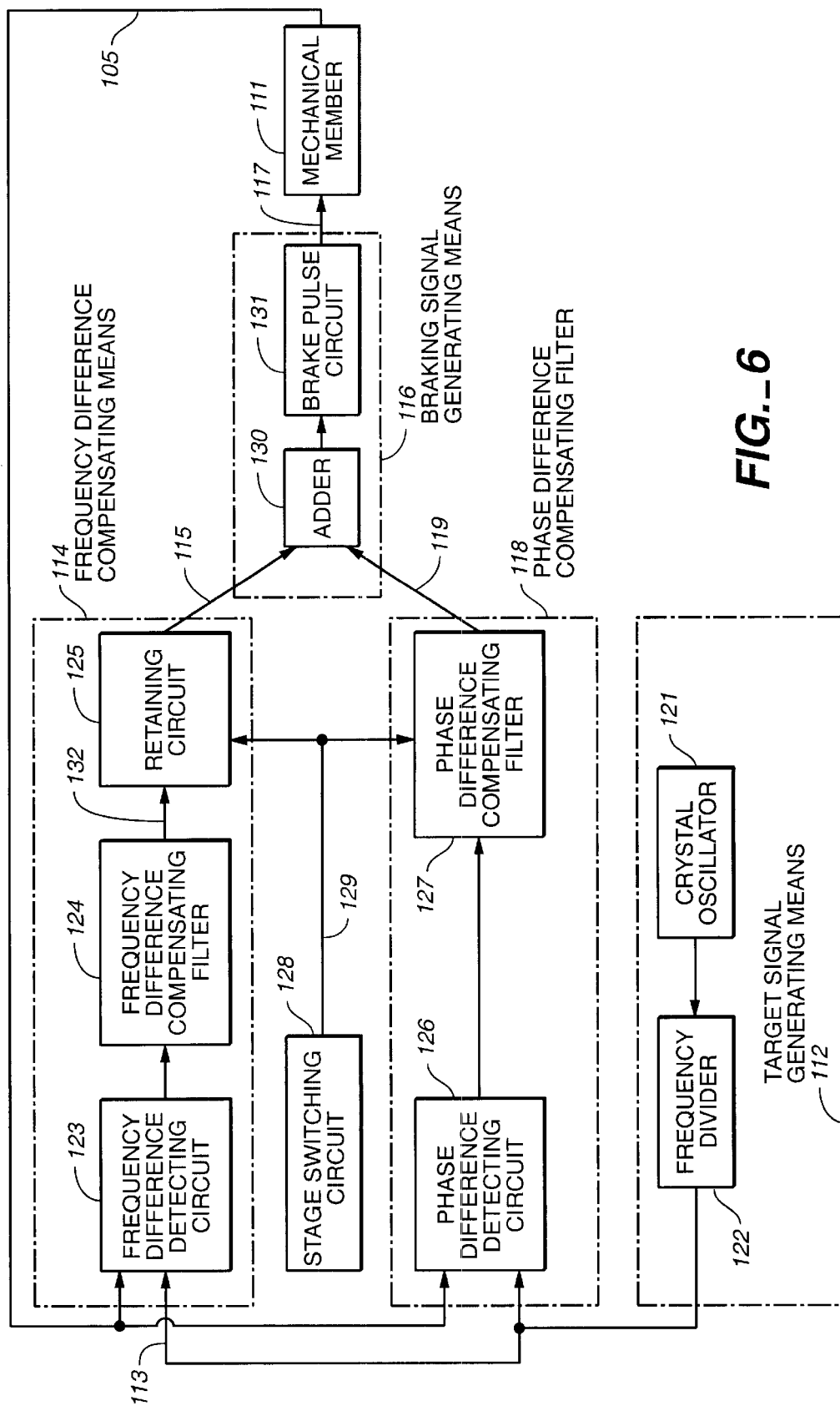
FIG._6

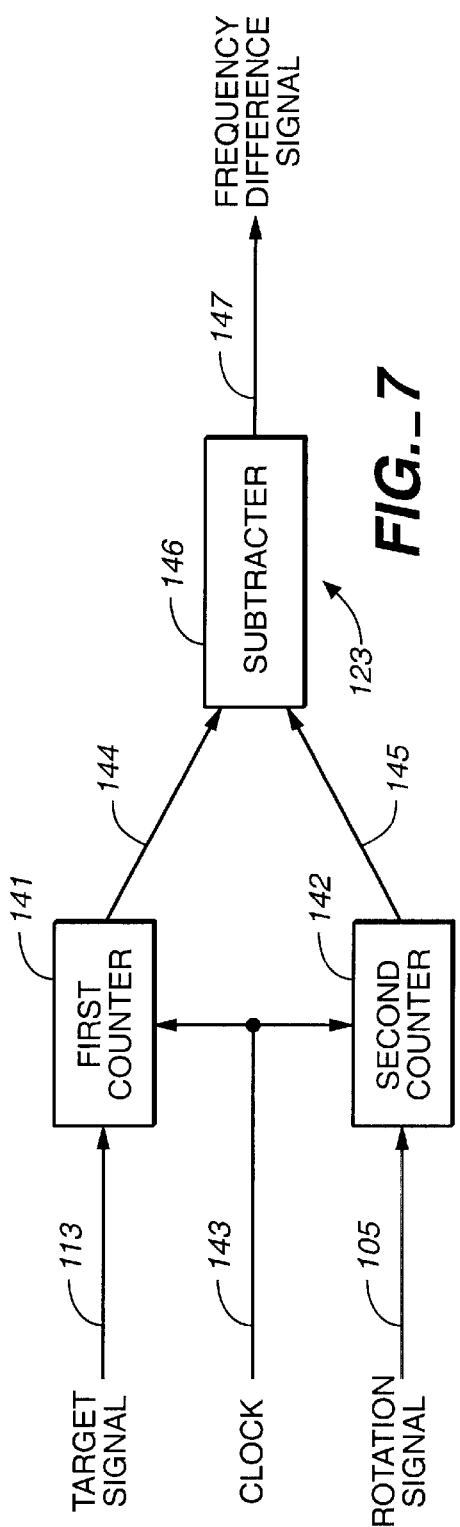
FIG._7
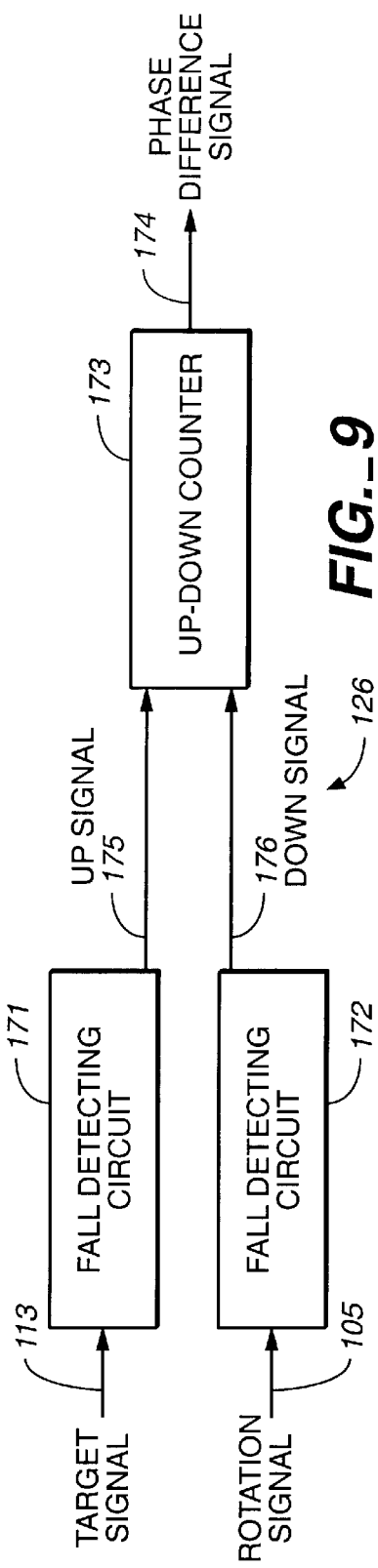
FIG._9

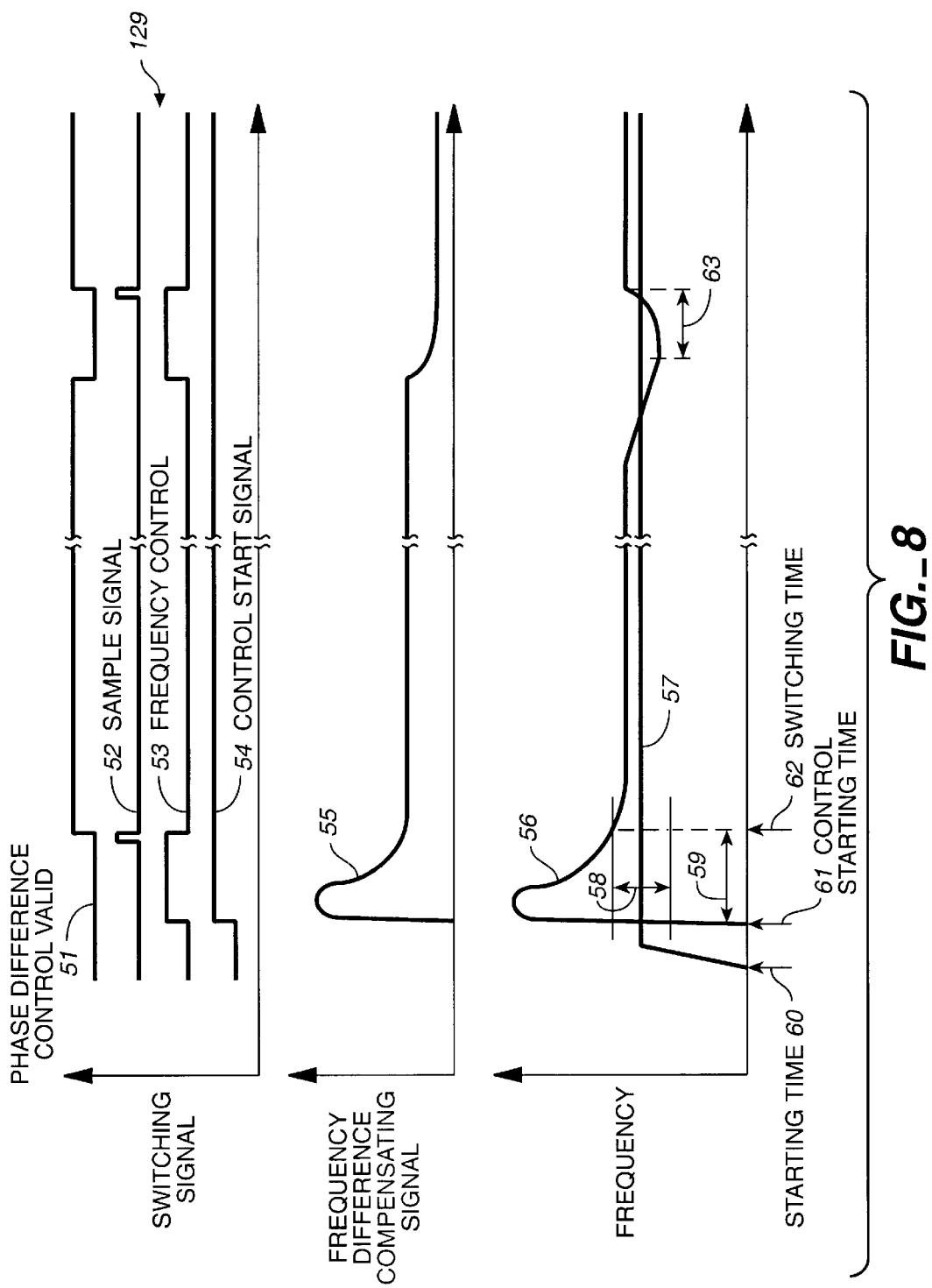
FIG._8

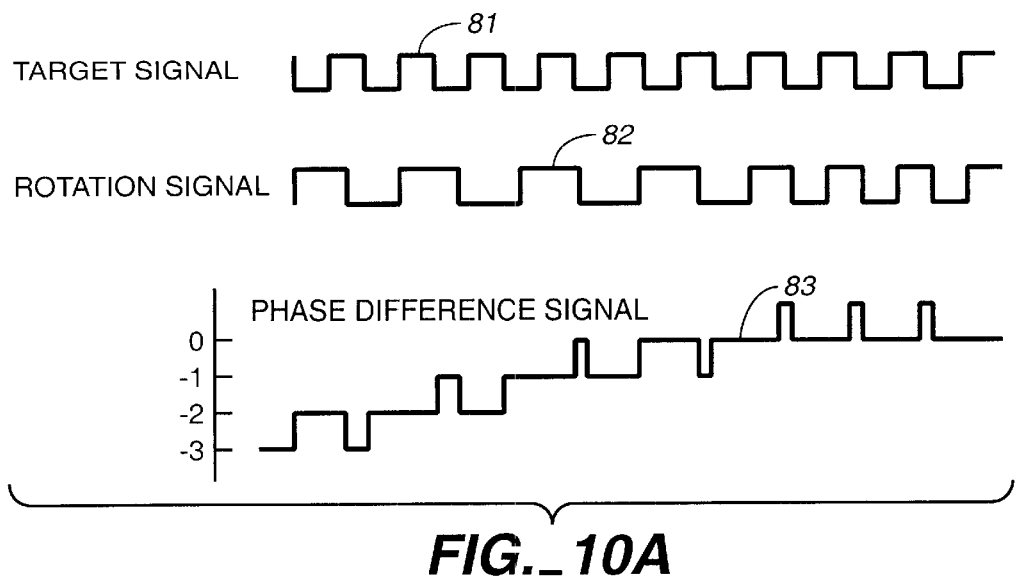
FIG._10A
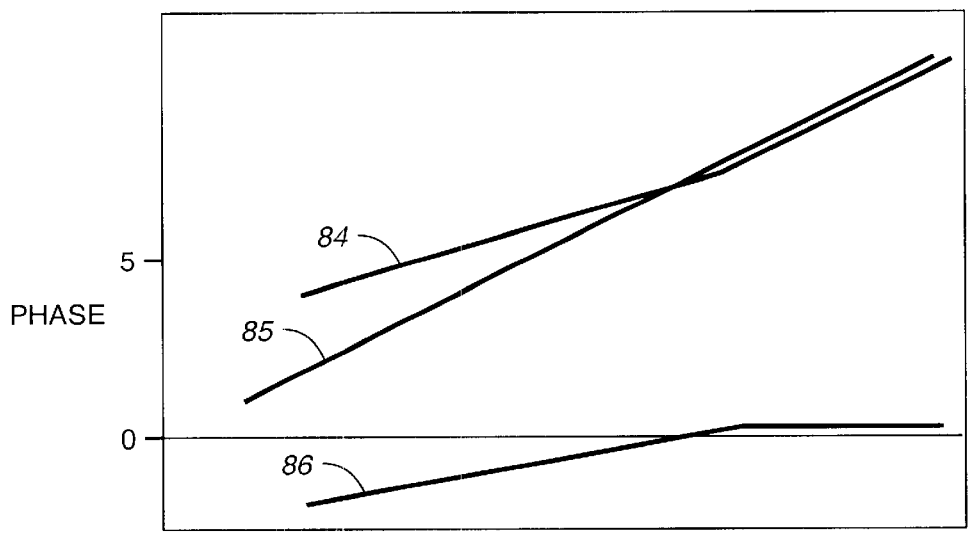
FIG._10B

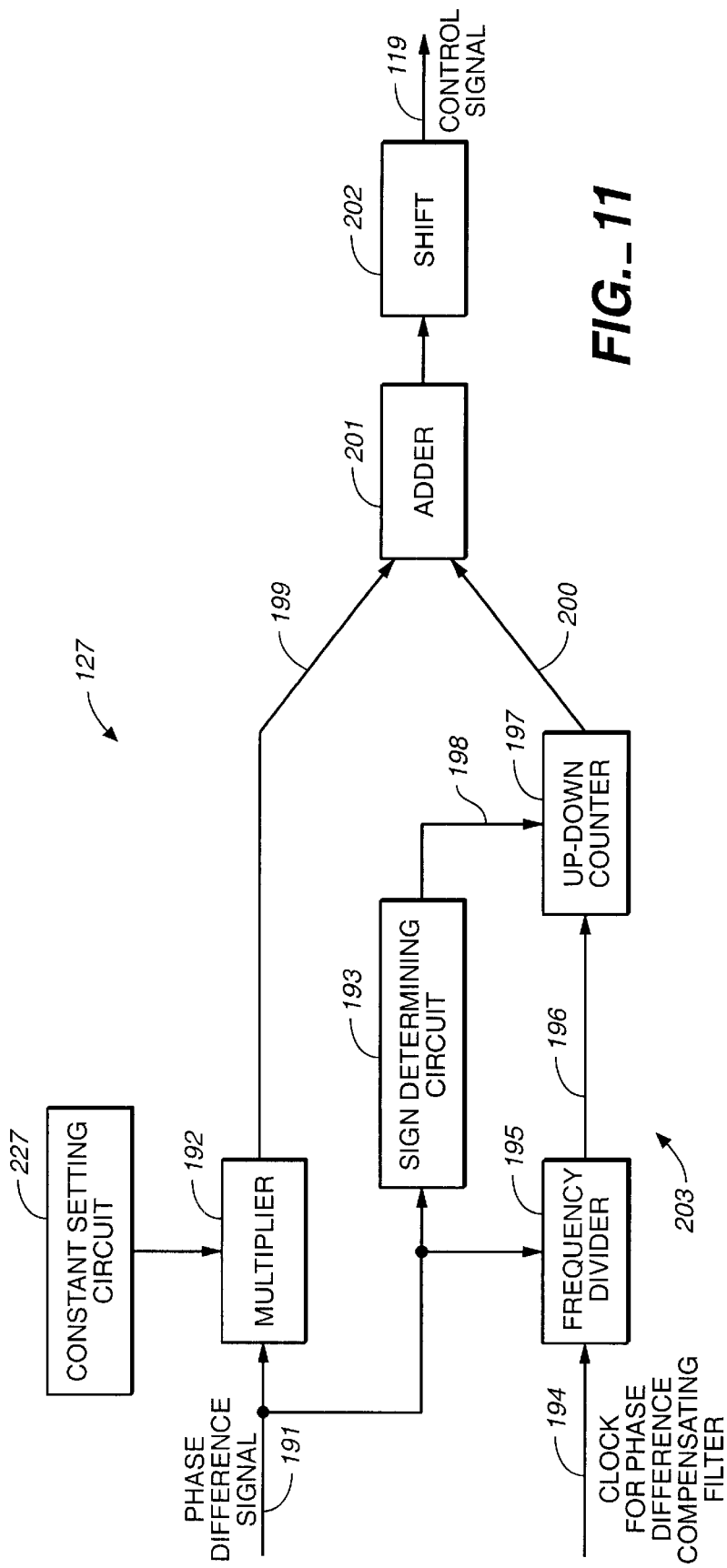
FIG._11

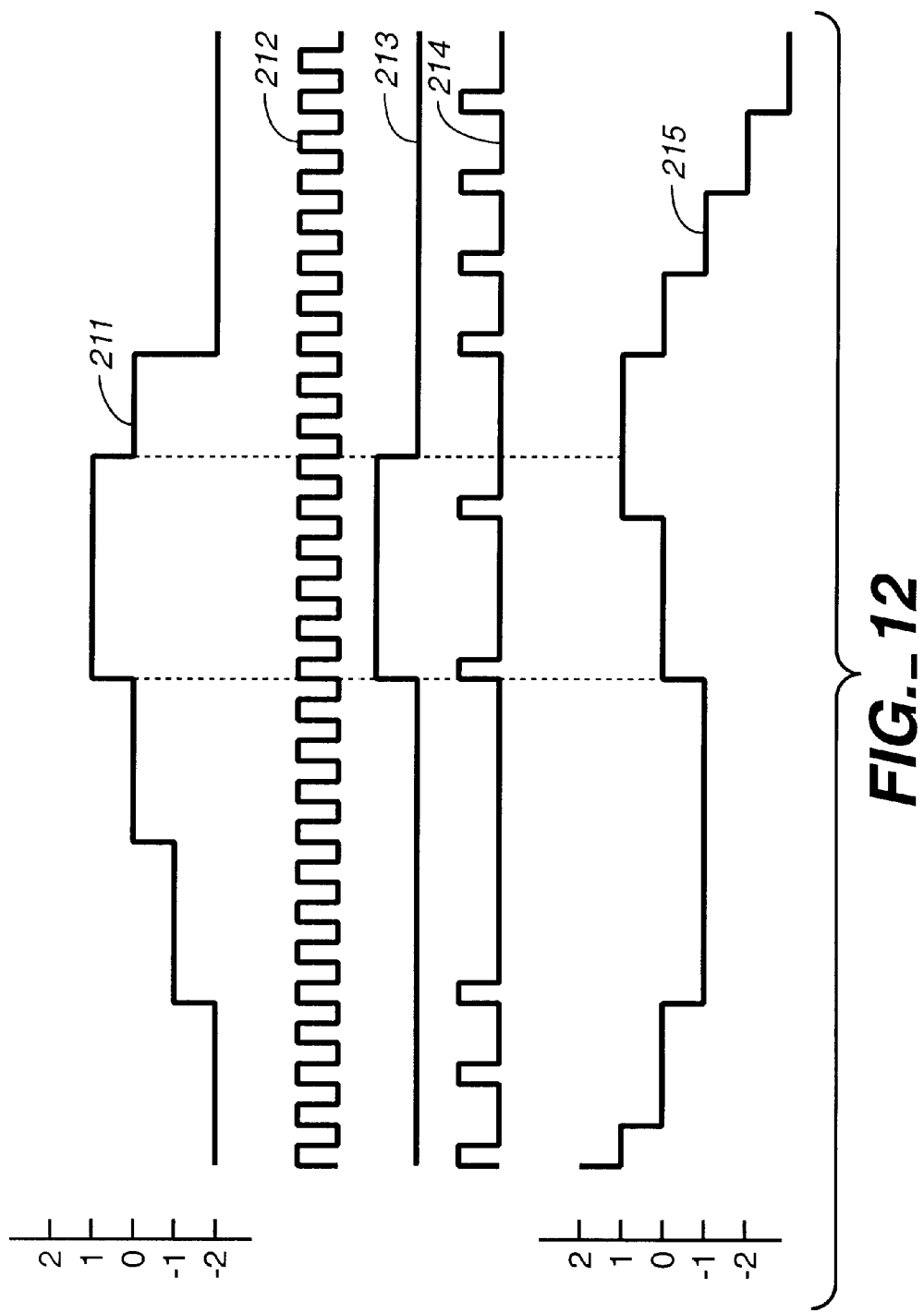
FIG._12

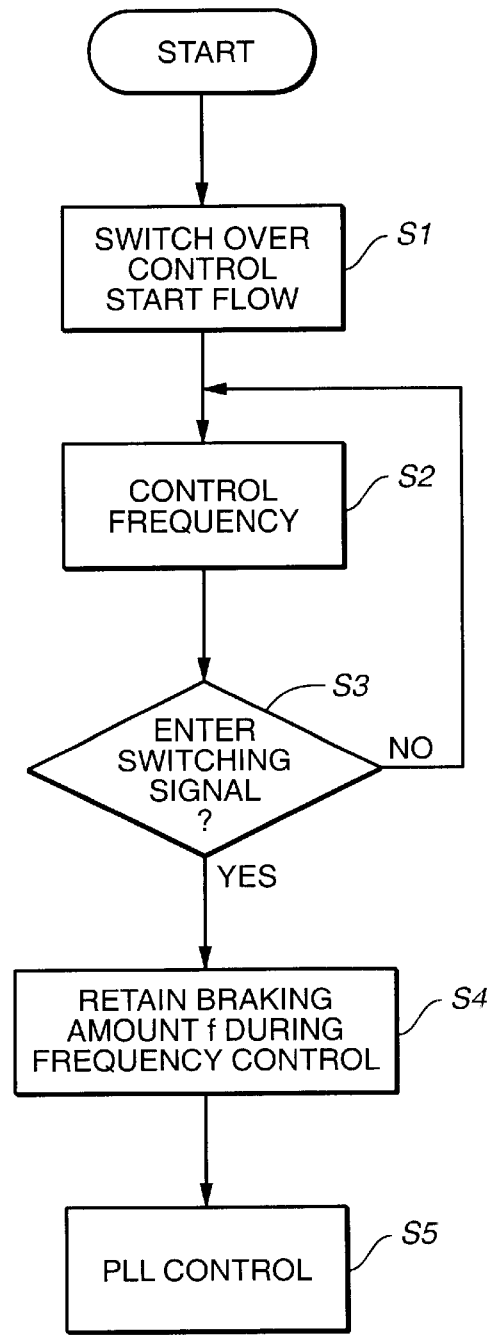
FIG._13
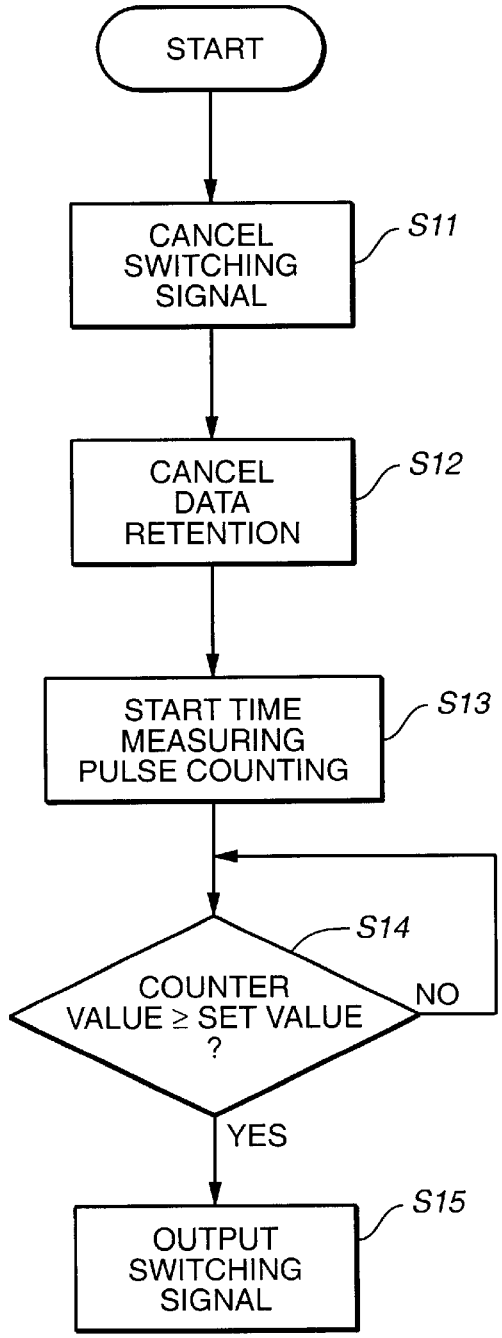
FIG._14

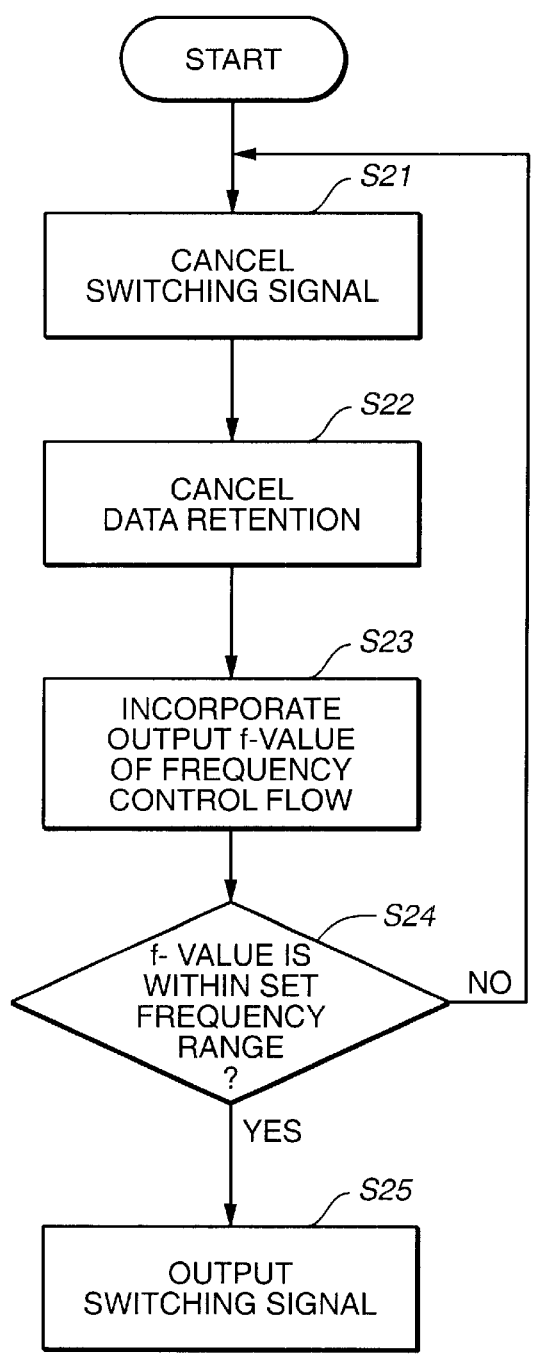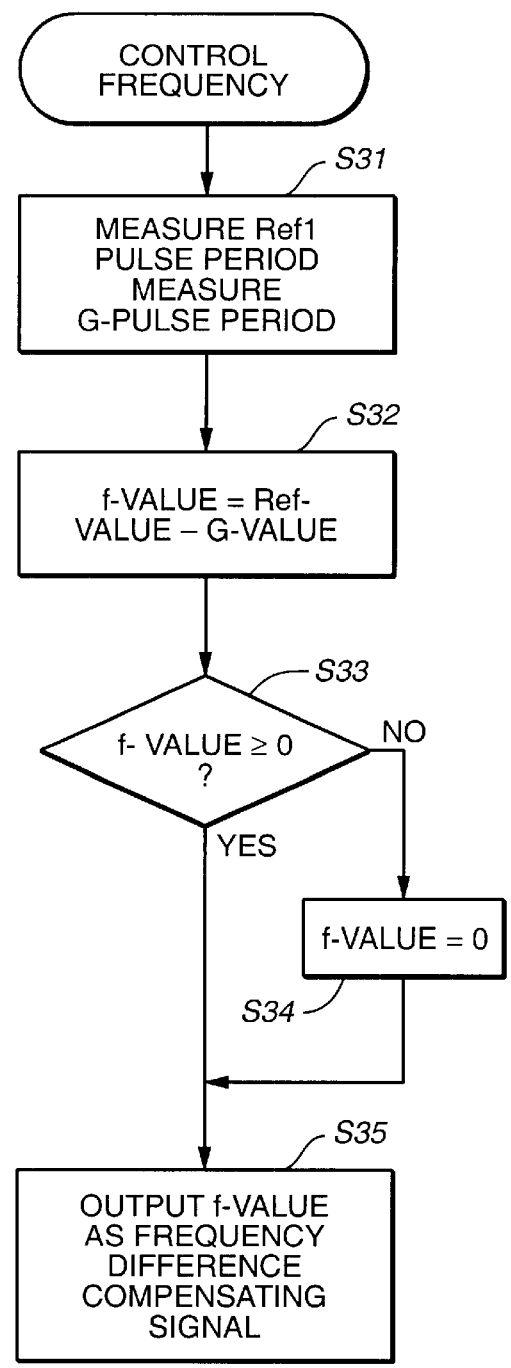
*FIG._15*　　　　　*FIG._16*

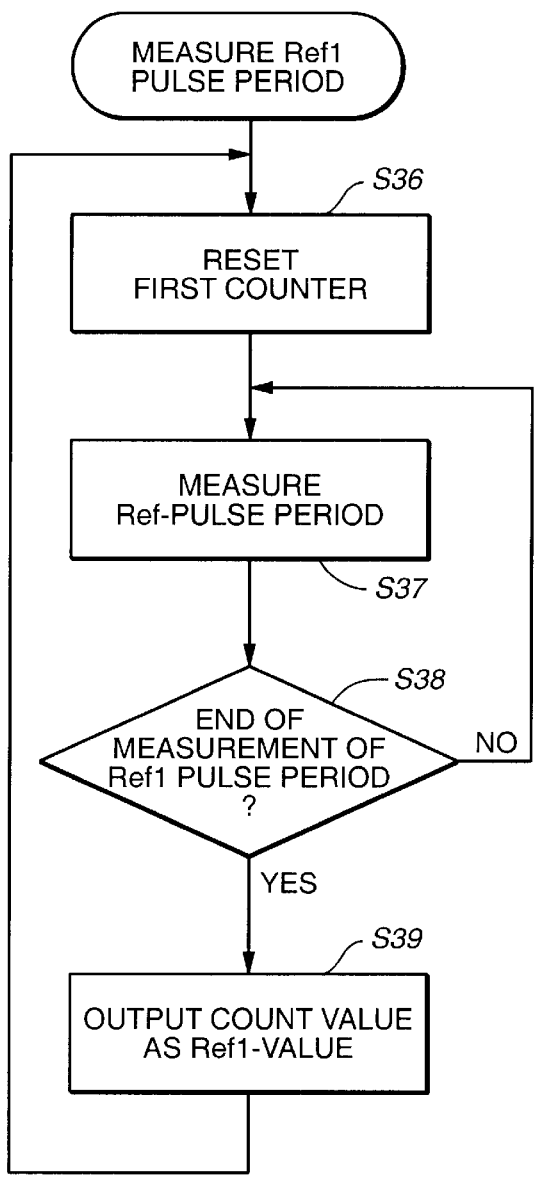
*FIG._17*
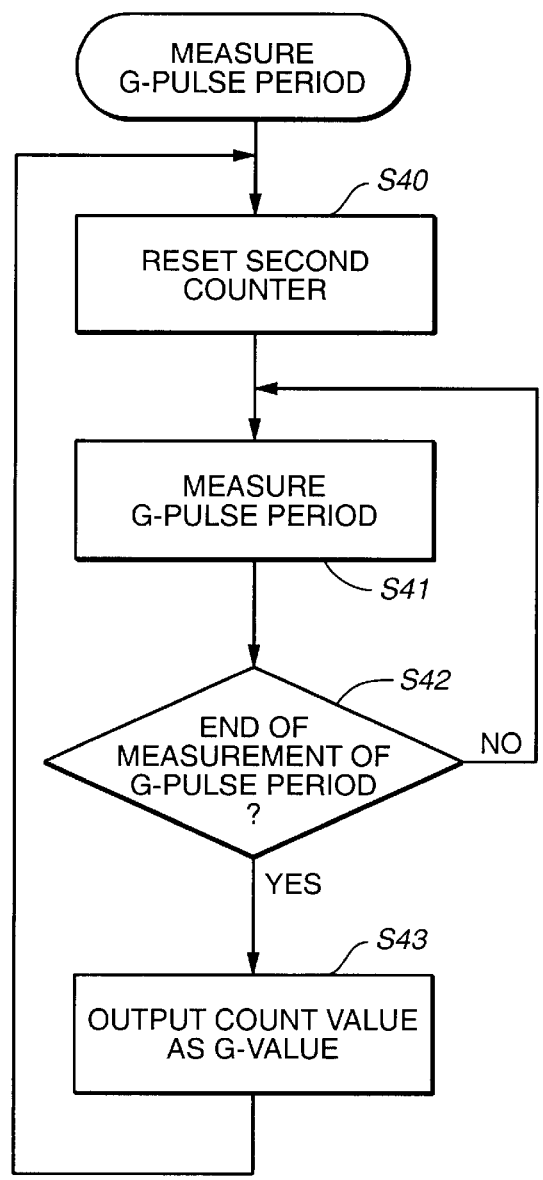
*FIG._18*

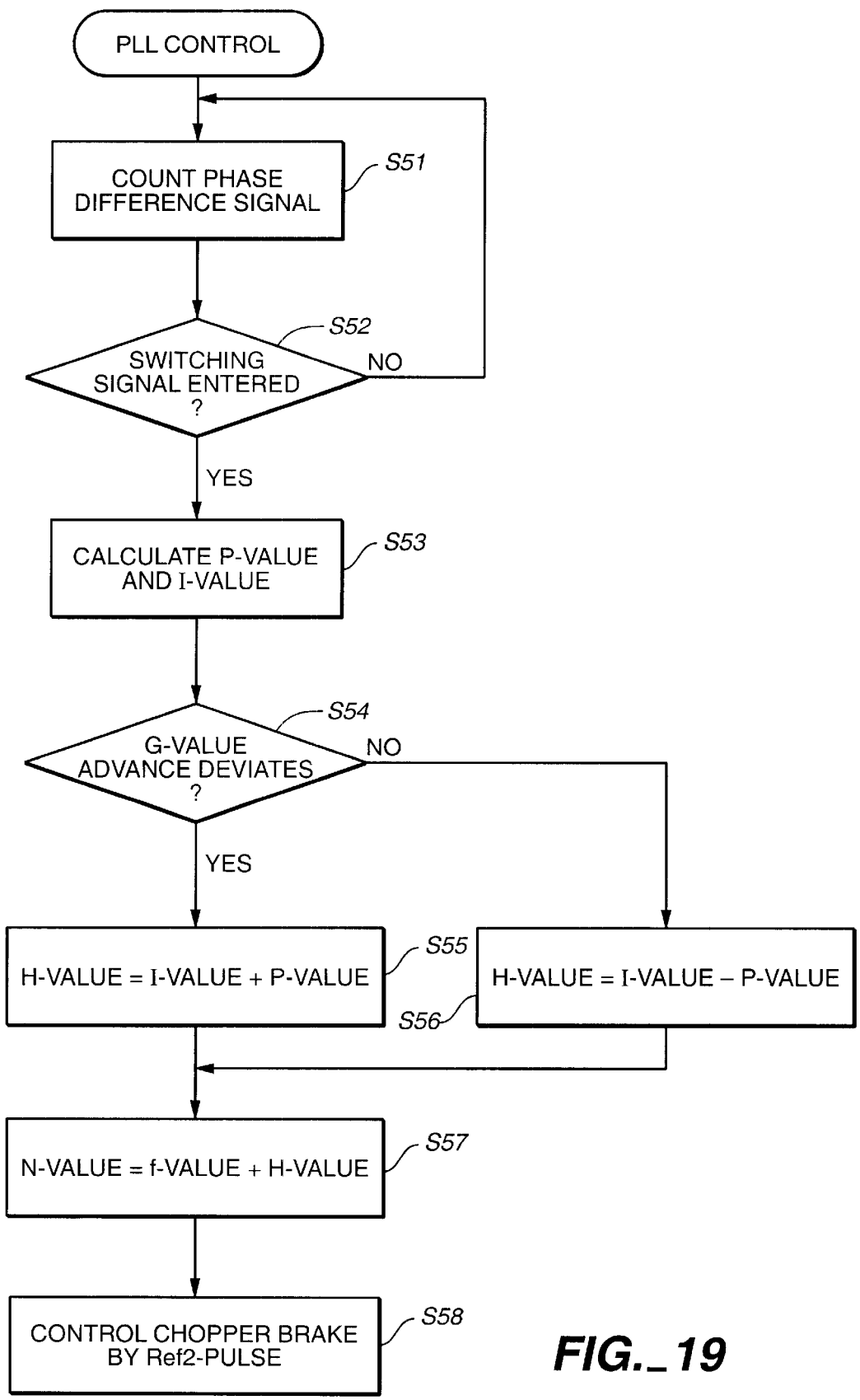
FIG._19

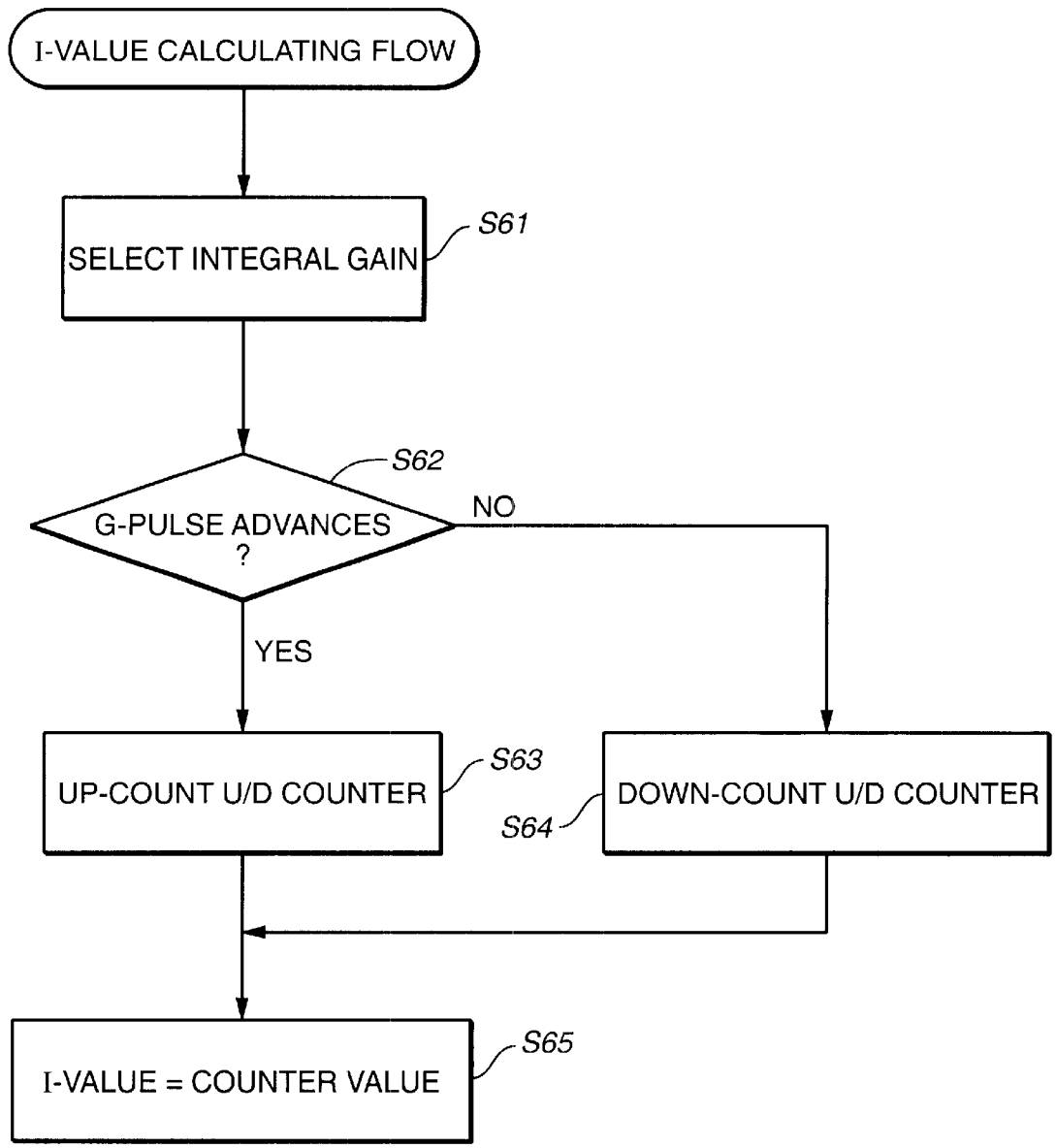
FIG._20

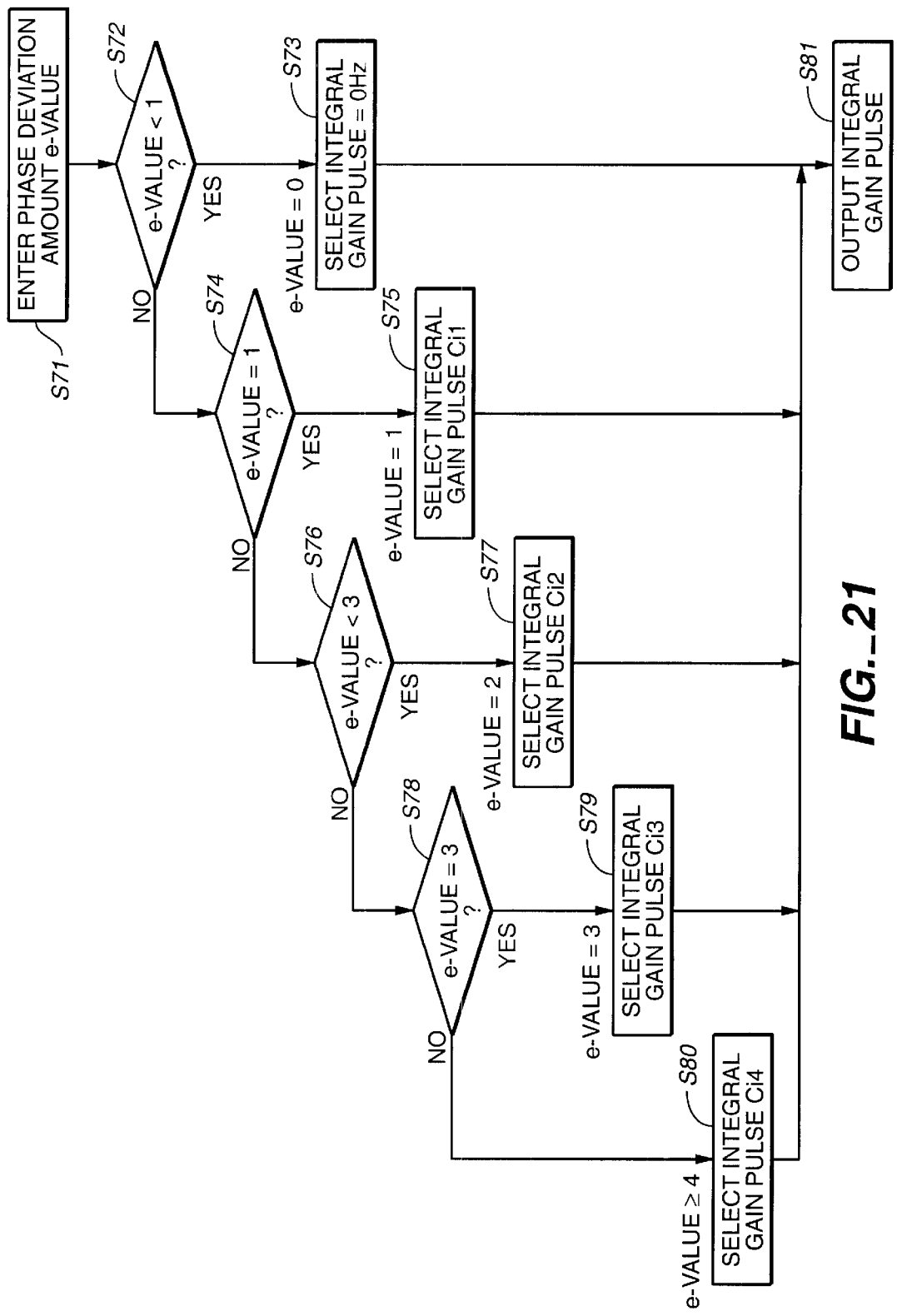
FIG._21

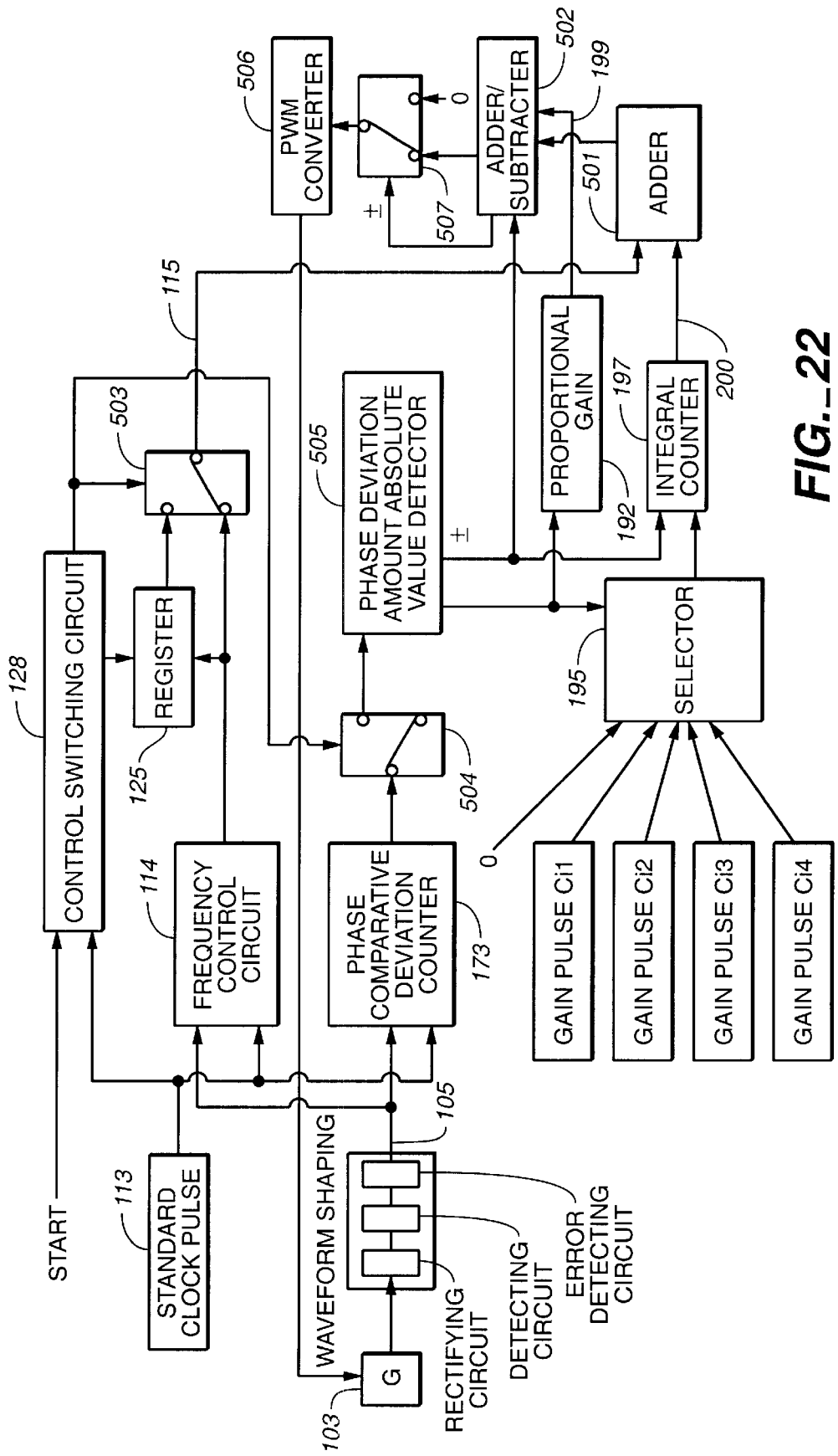
FIG._22

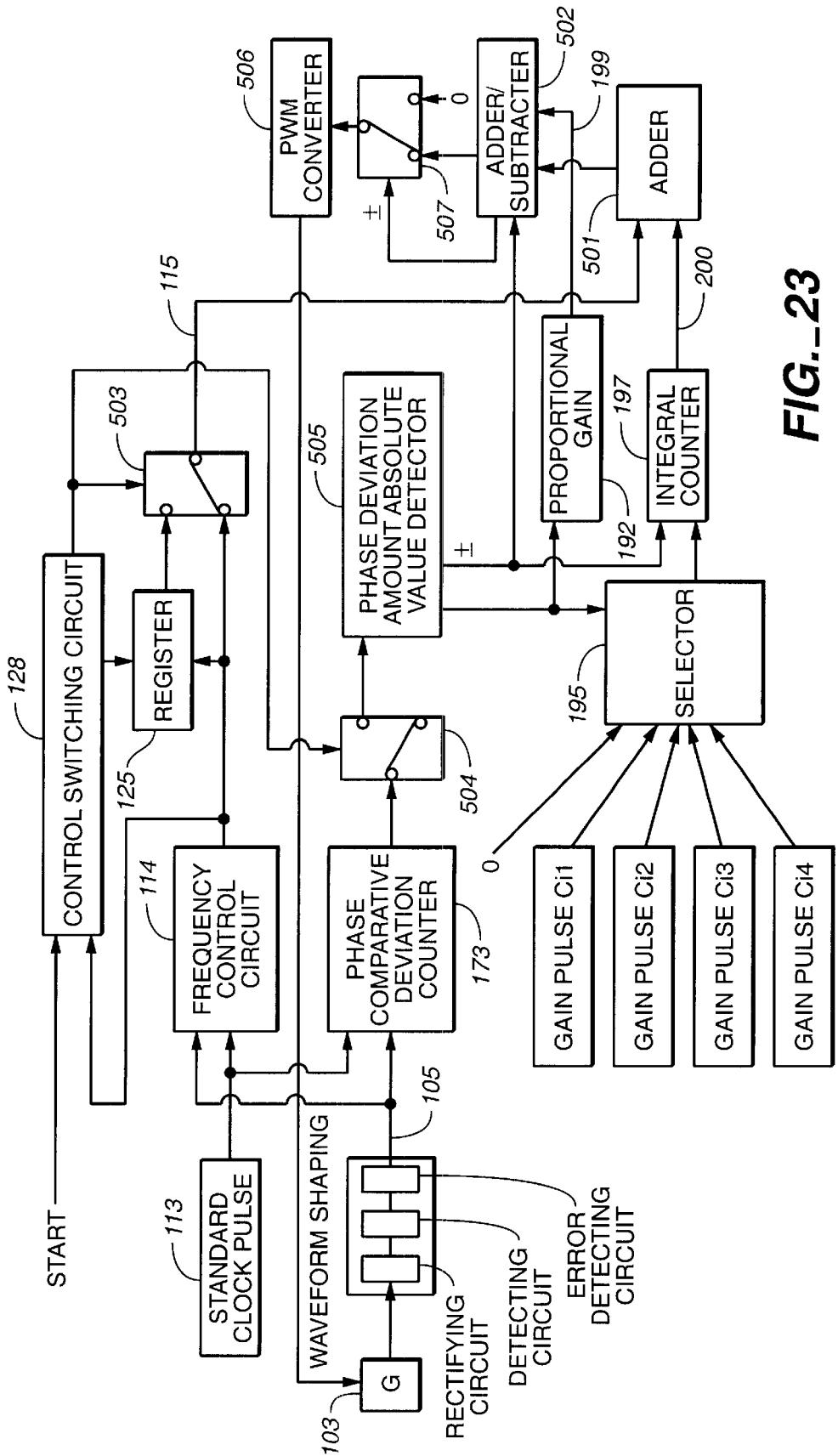
FIG._23

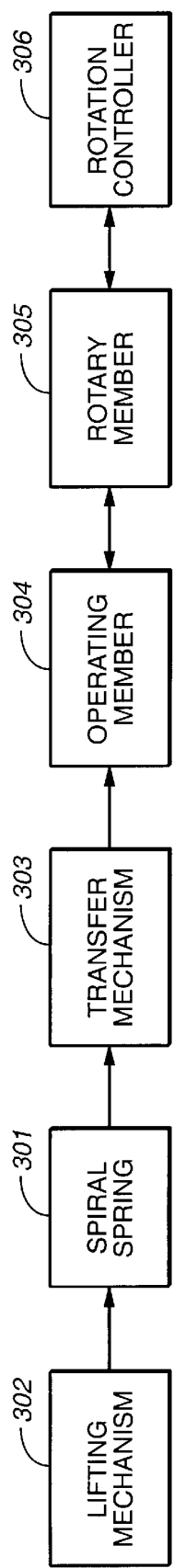
FIG._24
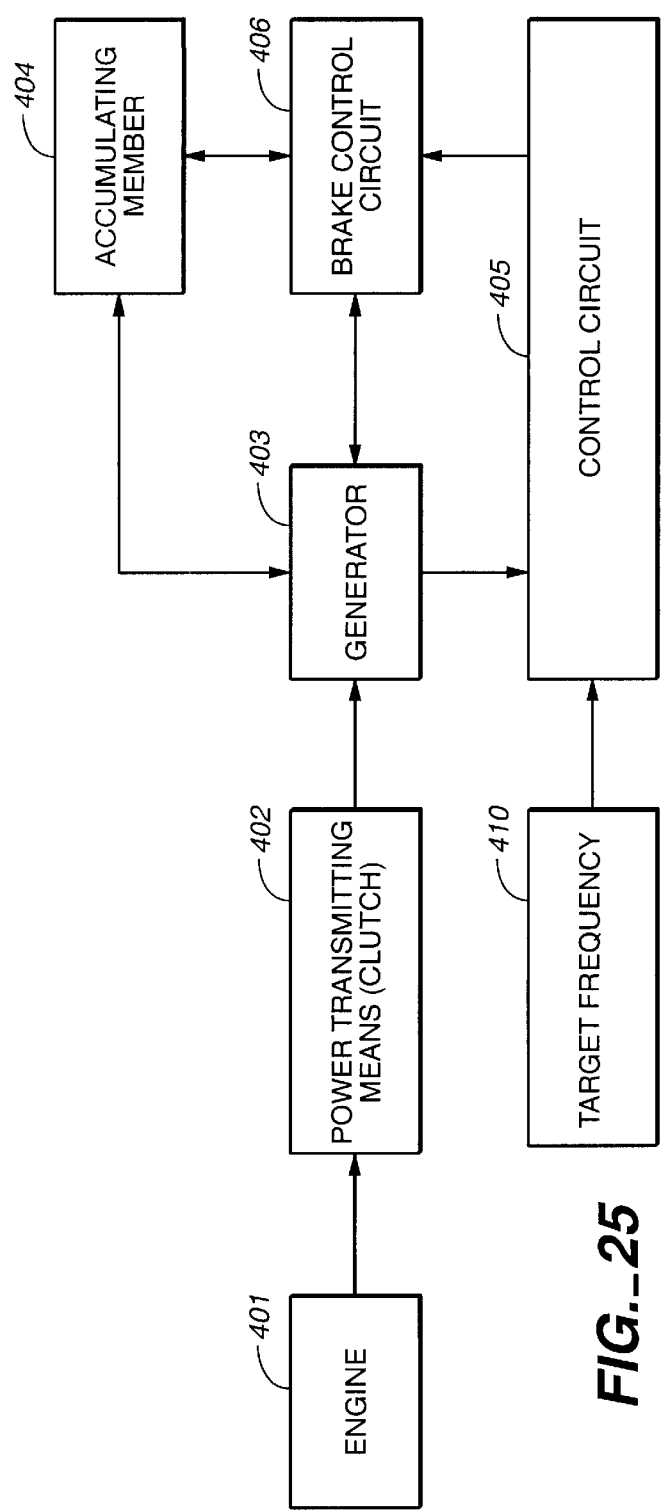
FIG._25

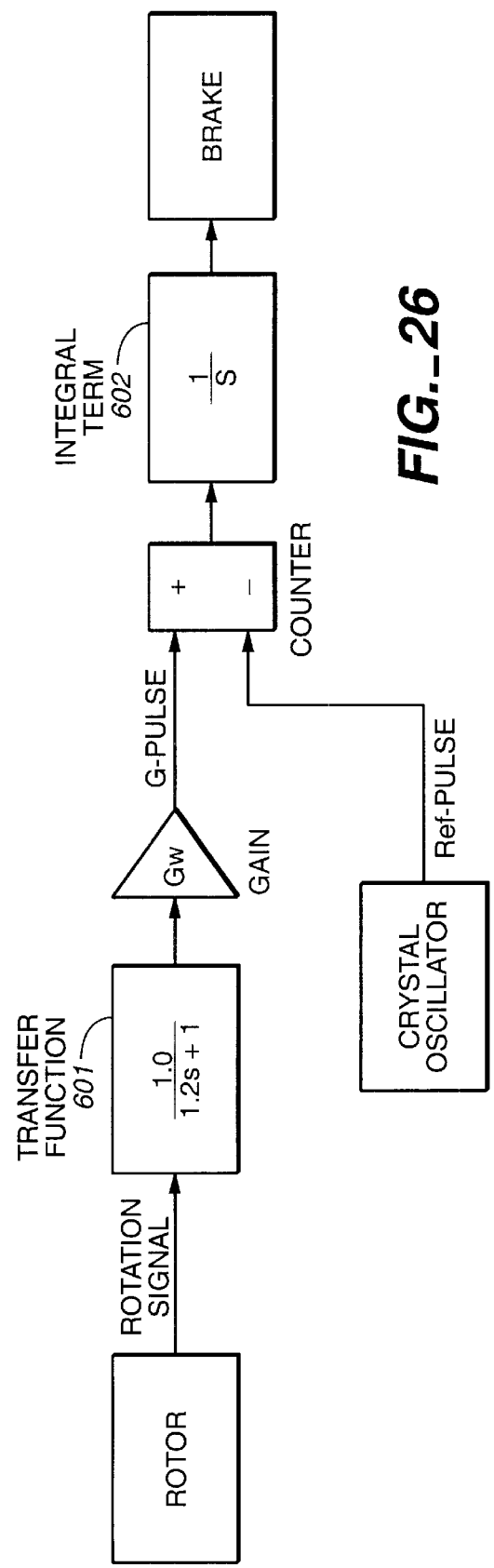
FIG._26

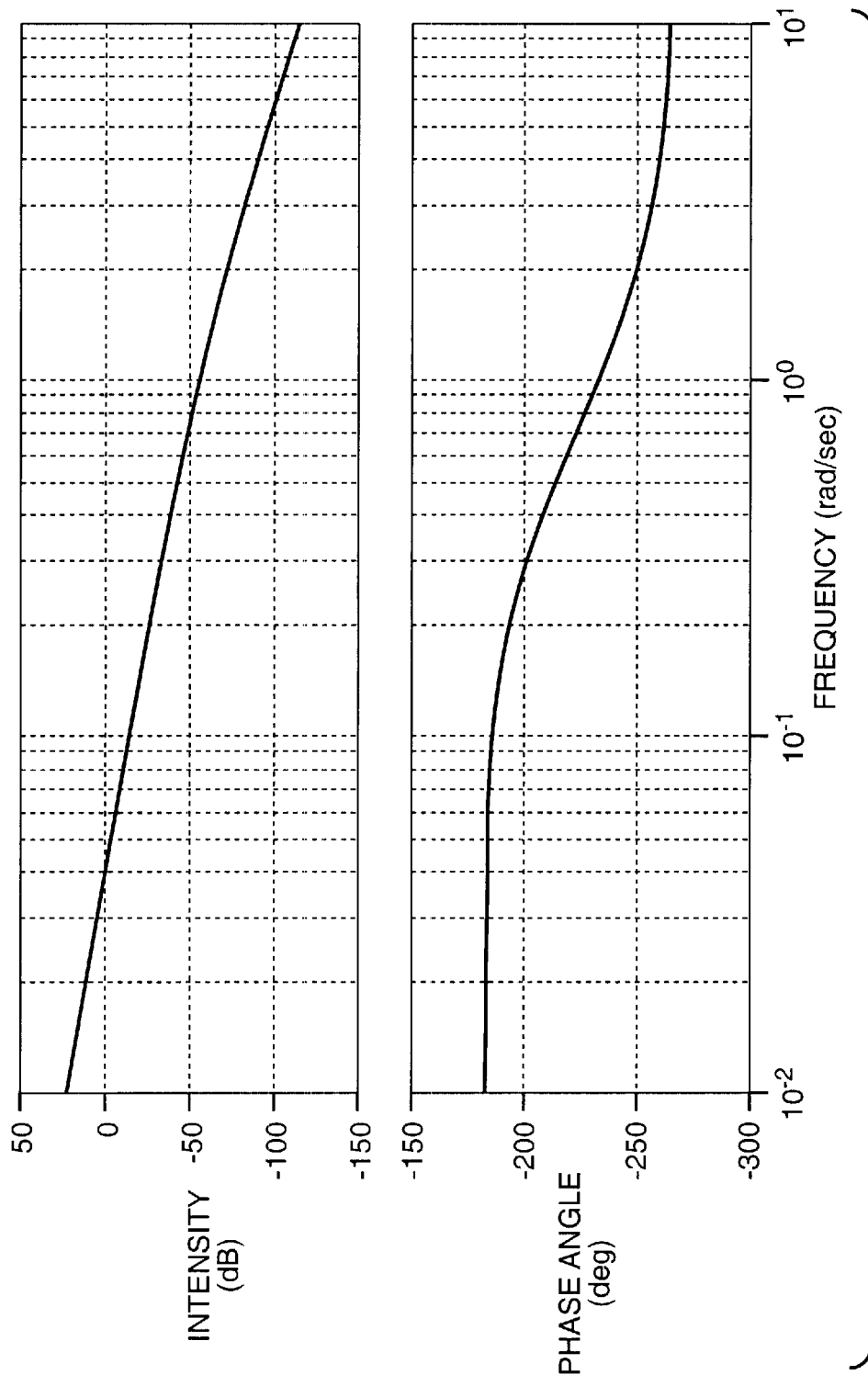
FIG._27

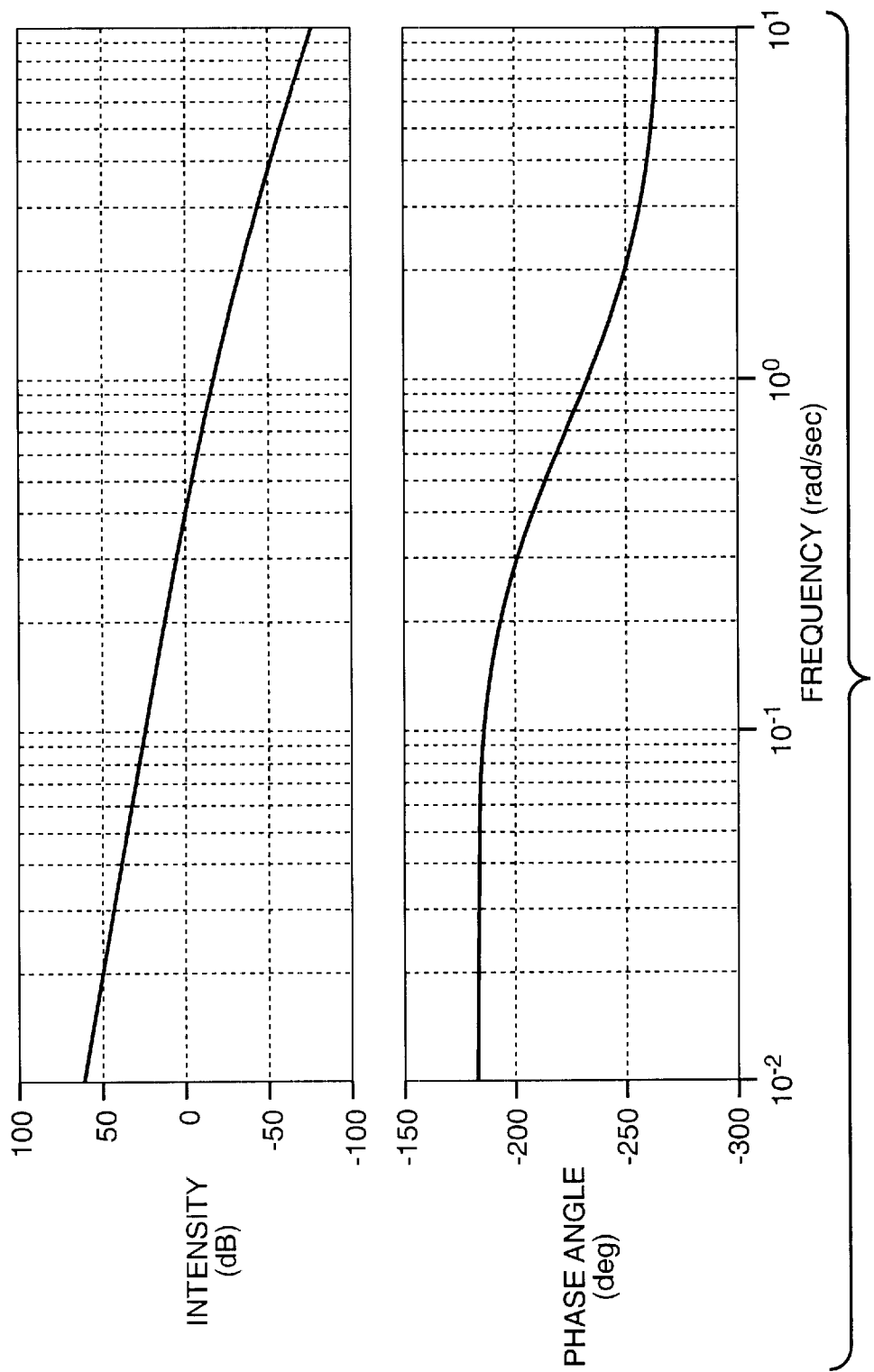
FIG._28

ROTATION CONTROLLER AND ROTATION CONTROL METHOD

TECHNICAL FIELD

The present invention relates to a rotation controller and a rotation control method. More particularly, the invention relates to a rotation controller and a rotation control method for adjusting the speed of a rotary member upon rotating any of various rotary members by the use of a spiral spring, an engine, electric power or human power.

BACK GROUND ART

Japanese Examined Patent Publication No. 07-119812 discloses one of the known electronically controlled mechanical watches based on a process comprising converting mechanical energy produced upon release of a spiral spring into electric energy by means of a generator, causing rotation control means to operate with this electric energy, and controlling the value of current flowing through a coil of the generator, thereby accurately driving a needle fixed to a train wheel and thus accurately displaying the time.

In the disclosed electronically controlled mechanical watch, the rotational speed of the generator is controlled by entering a signal based on the rotation of a rotor of the generator into a counter, entering on the other hand a signal from a crystal oscillator as well into the counter, comparing values from the individual counters, and controlling the generator on the basis of the resulting difference between these values. The counter is one known as an integral counter which compares the phase difference between reference clock pulse (Ref-pulse) and generator rotation period pulse (G-pulse), down-counting the U/D counter when G-pulse is gain, and up-counting the same if G-pulse is in loss.

At the time when a value obtained by measuring the time of one period of Ref-pulse agrees with a value obtained by the integral counter, the generator is braked, and braking is continued until the completion of time measurement of one period of Ref-pulse. The value of the integral counter would therefore sets the brake releasing time. More specifically, the value of the integral counter comprises an integrated value of the brake releasing time at which the average speed of G-pulse agrees with the target speed (Ref-pulse). That is, this system adopts integral control.

However, because the integral control method as described above is based on comparison of signals output during a period while counting them with the counter, it is possible to adjust the average speed of the rotor to a set time for a sufficiently long period of time, thus ensuring substantially constant speed control of operations. The rotation speed of the rotor cannot however be adjusted immediately, leading to a low response. In addition, this method has another problem in that a slight phase difference is produced before alignment with a target frequency be cause of the relationship between the force of the spiral spring and the braking force.

More specifically, integral control can be expressed by a block diagram shown in FIG. 26. In general, the transfer function used in a generator or a motor is known to be 1/s (sT+1). As shown in FIG. 26, this is composed of a primary delay transfer function 601 of 1/(sT+1) and an integral term 602 of 1/s. An integrating factor is therefore included in the generator itself to be controlled. Bode diagrams for a case where only integral control is applied to an object of control are shown in FIGS. 27 and 28.

In these Bode diagrams, conditions required for stabilizing rotation control are that the phase upon a phase margin, i.e., 0 db (gain crossing point) is ahead of −180°, and that the gain upon gain margin, i.e., with a phase of −180° (phase crossing point) is up to 0 db.

For integral control alone, however, there occurs a delay of −90° for the object to be controlled, and an additional delay of −90° as a result of integral control, as shown in FIG. 27. The phase characteristic is therefore that near −180°. It is consequently difficult to ensure stable control because a phase margin or a gain margin is unavailable from the integral control alone. In the watch disclosed in Japanese Examined Patent Publication No. 07-119812, therefore, it is necessary perform control with a very low frequency, and the resultant response is 0.016 Hz or under.

A case where the gain of the integral counter is assumed to be increased to 100 times as large is illustrated in FIG. 28. In this case also, the phase margin is later than −180°, so that a stable control cannot be expected.

As is clear from the information described above, the conventional control through integral control alone permits average speed adjustment, but involves a problem in that the phase deviation cannot be solved.

Another problem is that it is almost impossible to cope with a sudden disturbance encountered upon production of acceleration in a wristwatch by shaking the arm, because of the slow response of control.

Further, in the above-mentioned watch, using a spiral spring as power, the rotational force largely varies with the extent of winding. This causes a control error which in turn results in a loss or a gain of the watch. When using the watch as a wristwatch, movement of the arm causes an acceleration of the rotor, leading to a disturbance which causes an instable control status, resulting in a change in movement of the needle or a gain or a loss.

Since such an integral control is popularly utilized for controlling a rotary member, these problems are similarly encountered when controlling various rotary member requiring speed adjustment control, not limited to a watch, but including, for example, various toys comprising a rotary member such as a doll rotating under the action of a spiral spring, the drum of a music box, and an electric motor of a hybrid car based on a combination of a gasoline engine and an electric motor.

A first object of the present invention is to provide a rotation controller and a rotation control method which can solve a phase deviation of a rotary member, give a fast response of a control system, and are highly resistance to disturbance.

A second object of the invention is to provide a rotation controller and a rotation control method which permit downsizing of circuit scale and simplification of circuit configuration so as to be applicable to a small device such as a wristwatch.

Disclosure of Invention

The rotation controller of the present invention controlling the rotation period of a rotary member by applying a brake on the rotating rotary member by power supplied from a power source, comprising: rotation detecting means generating a rotation signal corresponding to revolutions of a rotary member; target signal generating means generating a target signal corresponding to target revolutions of the rotary member; phase difference compensating means detecting a phase difference between a rotation signal output by the rotation detecting means and a target signal output by the target signal generating means, and generating a phase difference compensating signal serving as a brake control signal; frequency difference compensating means detecting a frequency difference between the rotation signal and the target signal, and generating a frequency difference compensating signal serving as a brake control signal; and brake control means controlling the manner of braking by means of at least any one of the phase difference compensating signal from the phase difference compensating means and the frequency difference compensating signal from the frequency difference compensating means.

In the present invention, phases are compared between the rotation signal of the rotary member and the target signal of that rotary member, and a phase difference compensating signal serving as a brake control signal is entered into the braking circuit of the rotary member on the basis of the resultant phase difference, thus permitting achievement of a manner of control known as the phase synchronizing circuit control, i.e., PLL (phase-locked loop) control. It is therefore possible to set a braking level by comparing rotation signal waveforms between individual periods of the rotary member. A stable control system having a high response can be achieved if it is once adjusted within a locking range unless there if instantaneously a large change in signal waveform, and it is furthermore possible to eliminate a phase deviation.

Further, the frequency difference compensating means is provided in addition to the phase difference compensating means. Therefore, when the control comes off the locking range of PLL control as immediately after start of rotation control of the rotary member, control can be performed so as to bring the speed difference closer to 0 while disregarding the phase difference between a rotation signal and a target signal by the use of the frequency difference compensating means, thus making it possible to quickly adjust rotation of the rotary member within the locking range. By applying rotation control by the use of the phase difference compensating means after bring the speed difference closer to 0 with this frequency difference compensating means, therefore, it is possible to a larger phase deviation as compared with the control by the phase difference compensating means alone from being accumulated, and quickly accomplish speed adjustment control of the rotary member.

In the aforementioned rotation controller, it is desirable that the frequency difference compensating means has frequency difference compensation retaining means; that the brake control means has two control modes for a control starting stage immediately after start of rotation control and a constant stage when rotation control is stable; that, in the control starting stage, rotation control is performed in response to a frequency difference compensating signal from the frequency difference compensating means; and that, in the constant control stage, brake control is conducted in response to a sum signal of a frequency difference compensating signal retained by the frequency difference compensation retaining means upon switching the control starting stage to the constant control stage after stabilization of rotation control and the phase difference compensating signal.

In the invention, rotation control in the control starting stage is carried out on the basis of the frequency difference compensating signal from the frequency difference compensating means. Even when the revolutions of the rotary member largely deviate from the target revolutions, therefore, it is possible to quickly approach the target revolutions and conduct rotation control with a high response.

Further, in the constant control stage, rotation control is conducted by the use of a sum signal of the frequency difference compensating signal and the phase difference compensating signal. It is therefore possible to set an approximate amount of braking from the frequency difference compensating signal. Because it suffices, with the phase difference compensating signal, to set an amount of braking for fine control which cannot be effected with the frequency difference compensating signal, it is possible to quickly determine the optimum amount of control by summing up the individual signals, thus permitting further improvement of response in the rotation control.

In addition, since the frequency difference compensating signal is required only to permit calculation of an approximate amount of braking, the configuration of the frequency difference compensating means can be simplified.

In the control starting stage, the brake control means may determine from a difference in frequency that rotation control has been stabilized. Determination from the frequency difference makes it possible to accurately and relatively easily determine that rotation control has been stabilized, thus permitting appropriate switching of control independently of dispersions of the rotary member.

In the control starting stage, the brake control means may deem the rotation control to have been stabilized upon the lapse of a certain predetermined period of time from the start of control, and may switch over control from the control starting stage to the constant control stage. By making a determination with time, the circuit configuration can be made simpler than in determination from the frequency difference, and the circuit can easily be downsized, thus permitting easy application for compact devices such as a wristwatch, or other timepiece.

It is desirable that the phase difference compensating means comprises phase difference detecting means and compensating signal generating means for receiving an output therefrom; that the rotation signal and the target signal have a repeated pulse waveform; and that the phase difference detecting means has a counter which performs an addition or a subtraction at rise or fall of the target signal, and a subtraction or an addition at rise or fall of the rotation signal so as to sum up the member of rises or falls of each signal, and outputs an output of the counter as a phase difference signal.

When the phase difference detecting means comprises a counter, it is possible to easily achieve a simple circuit configuration, and hence a more compact device, and thus to reduce the cost. Further, because it is possible to use a counter capable of retaining a plurality of counter values, phase differences can be detected in a wide range. Possibility to retain cumulative values thereof even when phase differences are cumulated makes it possible to perform a control meeting a cumulative phase difference, leading to a more accurate speed adjusting control.

It is further desirable that the phase difference compensating means further comprises a phase difference compensating filter having an integrating function; and that the phase difference compensating filter comprises a sign detecting circuit detecting a sign of the phase difference signal, a frequency divider dividing frequency with a dividing ratio variable depending upon the absolute value of the phase difference signal, and a counter adds or subtracts an output of the frequency divider with the sign. In this case, the phase difference compensating filter serves as a compensating signal generating means, and a counter output serves as a phase difference compensating signal.

Since the dividing ratio of the frequency divider with the absolute value of the phase difference signal is made variable, it is possible to set an appropriate magnitude of the phase difference compensating signal, depending upon the extent of the phase difference, thus permitting control so as to quickly eliminate the phase difference.

The rotary member may be the generator in an electrically controlled mechanical timepiece comprising a mechanical energy source, a generator, driven by the mechanical energy source connected via a train wheel, generating an induced power and thus supplying electric energy, and a pointer connected to the train wheel. When applying the invention to such an electronically controlled mechanical timepiece, and upon resuming needle operation after needle alignment from stoppage of the generator for needle alignment, it is possible to quickly cause the generator rotation to meet target revolutions (for example, reference frequency from a crystal oscillator), and quickly switch to an accurate needle operation.

Further, the rotary member may be a rotary member in a toy comprising a mechanical energy source an operating member such as a doll driven by the mechanical energy source connected via a power transmitting mechanism, and a rotary member rotated in linkage with this operating member.

The rotary member may also be the motor in a toy comprising an electric energy source, and a motor driven by the electric energy source.

By applying the present invention to various toys as described above, it is possible to accurately and quickly control the rotation speed of a rotary member or a motor, cause a change in the rotation speed in response to operation by a child playing with the toy, and perform high-level play even upon occurrence of a change.

The rotary member may be the generator in a hybrid car comprising an engine, and a generator serving also as a motor driven by the engine. By applying the invention to such a hybrid car, it is possible, upon conducting autocruising control, for example, to perform speed adjustment without largely changing the engine output, by rotating the generator at the target revolutions, and to reduce the fuel consumption.

The rotation control method of the present invention for controlling the rotation period of a rotary member by braking the rotary member rotated by a power supplied by a power source, comprising the steps of: detecting a phase difference by comparing a rotation signal corresponding to revolutions of the rotary member and a target signal corresponding to target revolutions of the rotary member; detecting a frequency difference between the rotation signal and the target signal; and controlling a brake of the rotary member by means of at least one of a phase difference compensating signal corresponding to the phase difference and a frequency difference compensating signal corresponding to the frequency difference.

In the present invention, the rotary member is controlled by a combination of phase synchronization circuit control (PLL control) and frequency difference control. This permits quick speed adjustment control of the rotary member, and achievement of a stable control of the rotary member with a high response.

This method should preferably comprises the steps of: conducting brake control of the rotary member by means of the frequency difference compensating signal in a control starting stage immediately after start of rotation control; upon stabilization of rotation control, switching over the control to the constant control stage while retaining the frequency difference compensating signal at this point; and in the constant control stage, performing brake control of the rotary member by means of an addition signal of the retained frequency difference compensating signal and the phase difference compensating signal.

In the method of the invention, rotation control is carried out by means of the frequency difference compensating signal in the control starting stage, and rotation control is conducted by the use of the sum signal of the frequency difference compensating signal and the phase difference compensating signal in the constant control stage. Even when the revolutions of the rotary member largely deviate from the target revolutions upon starting control, therefore, it is possible to quickly bring the revolutions closer to the target revolutions, thus permitting high-response rotation control. In the constant control stage, the amount of braking can be finely adjusted with the phase difference compensating signal after setting an approximate amount of braking with the frequency difference compensating signal. It is therefore possible to quickly determine an optimum amount of control and thus further improve response of rotation control.

In the rotation control method of the invention, stabilization of the rotation control in the control starting stage may be determined from a frequency difference. In the control starting stage, rotation control may be deemed to have been stabilized upon the lapse of a certain predetermined period of time from the start of control, and control may be switched over from the control starting stage to the constant control stage.

BRIEF DESCRIPTION OF DRAWINGS

FIG. 1 is a plan view illustrating part of an electronically controlled mechanical watch in an embodiment of the present invention;

FIG. 2 is a sectional view of the part shown in FIG. 1;

FIG. 3 is a sectional view of the part shown in FIG. 1;

FIG. 4 is a block diagram of a control system of the invention;

FIG. 5 is a configuration diagram of a control circuit of a mechanical member;

FIG. 6 is a detailed configuration diagram of the control circuit of the embodiment;

FIG. 7 is a configuration diagram of a frequency difference detecting circuit of the embodiment;

FIG. 8 is a descriptive view of functions of frequency difference compensating means of the embodiment;

FIG. 9 is a configuration diagram of a phase difference detecting circuit of the embodiment;

FIGS. 10 and 10B are waveform diagrams in the phase difference detecting circuit of the embodiment;

FIG. 11 is a configuration diagram of a phase difference compensating filter of the embodiment;

FIG. 12 is an operational waveform diagram of the phase difference compensating filter of the embodiment;

FIG. 13 is a flowchart illustrating a brake control method of the embodiment;

FIG. 14 is a flowchart illustrating a typical control switching flow;

FIG. 15 is a flowchart illustrating another typical control switching flow;

FIG. 16 is a flowchart illustrating a frequency control flow;

FIG. 17 is flowchart illustrating an Ref1-pulse period measuring flow;

FIG. 18 is a flowchart illustrating a G-pulse period measuring flow;

FIG. 19 is a flowchart illustrating a PLL control flow;

FIG. 20 is a flowchart illustrating an I-value calculating flow of FIG. 19;

FIG. 21 is a flowchart illustrating an integral gain selecting flow of FIG. 20;

FIG. 22 is a configuration diagram illustrating a variant of the invention;

FIG. 23 is a configuration diagram illustrating another variant of the invention FIG. 24 is a configuration diagram illustrating still another variant of the invention;

FIG. 25 is a configuration diagram illustrating further variant of the invention;

FIG. 26 is a block diagram illustrating a configuration of a conventional case;

FIG. 27 is a Bode diagram of the conventional case; and

FIG. 28 is another Bode diagram of the conventional case.

BEST MODE FOR CARRYING OUT THE INVENTION

The present invention will now be described further in detail with reference to an attached drawings.

FIG. 1 is a plan view illustrating part of an electronically controlled mechanical watch of a first embodiment of the present invention, and FIGS. 2 and 3 are sectional views thereof.

The electronically controlled mechanical watch has a movement barrel 1 comprising a spiral spring 1a, a barrel wheel gear 1b, barrel arbor 1c, and a barrel cover 1d. The spiral spring 1a has an outer end fixed to the barrel wheel gear 1b and an inner end connected the barrel arbor 1c. The barrel arbor 1c is supported by a main plate 2 and train wheel bridge 3, and is secured by a ratchet screw 5 so as to rotate integrally with a ratchet wheel 4.

The ratchet wheel 4 is engaged with click 6 so as to rotate clockwise but not anticlockwise. The method of winding the spiral spring 1a by turning the ratchet screw 4 clockwise, comprising the same steps as in automatic or manual winding of a mechanical watch, is not described here. Rotation speed of the barrel wheel gear 1b is increased to seven times as high and transmitted to a second wheel 7, and then sequentially transmitted to a third wheel 8 at a speed increased to 6.4 times as high, to fourth wheel 9 at a speed 9.375 times as high, to a fifth wheel 10 at a speed three times as high, to a sixth wheel 11 at a speed ten times as high, and then, to the rotor 12 at a speed ten times as high: the speed is thus increased in total to 126,000 times as high.

A cannon pinion 7a is fixed to the second wheel 7; a minute needle 13 is fixed to the cannon pinion 7a, and a second needle 14 is fixed to the fourth wheel 9. In order to rotate the second wheel 7 at 1 rph and the fourth wheel 9 at 1 rpm, therefore, it suffices to conduct control so that the rotor 12 rotates at 5 rps. At this point, the barrel wheel gear 1b would rotate at 1/7 rph.

This electronically controlled mechanical watch has a generator 20 comprising a rotor 12, a stator 15, and a coil block 16. The rotor 12 comprises a rotor magnet 12a, a rotor cannon pinion 12b, and a rotor inertia disk 12c. The rotor inertia disk 12c is to reduce dispersions in revolutions of the rotor 12 relative to changes in drive torque from the movement barrel. The stator 15 is composed of a stator body 15a on which a stator coil 15b is wound in 40,000 turns.

The coil block 16 is prepared by winding a coil 16b onto a magnetic core 16a in 110,000 turns. The stator body 15a and the magnetic core 16a are made of, for example, PC permalloy. The stator coil 15b and the coil 16b are connected in series so as to give an output voltage added with a generator voltage, respectively.

The control circuit of the electronically controlled mechanical watch will now be described with reference to FIGS. 4 to 9.

FIG. 4 illustrates a block diagram showing functions of this embodiment. In this block diagram, a power source 101 is a spiral spring 1a, and power transmitting means 102 or power transmission is a speed-increasing wheel row comprising gear 7 to 11. Display means 106 or display comprises needles (a minutes needle 13 and a second needle 14), and a rotary member 103 is the rotor 12 of the generator 20. The revolutions of the rotary member 103 driven via the power transmitting means 102 by the power generated by the power source 101 can be controlled so as to be reduced by braking means 104 or brake so as to cause the rotary member 103 to rotate at target revolutions through extent of braking.

A rotation signal 105 is output from the rotary member 103. The rotation signal 105 is a repeated pulse signal proportional to the revolutions of the rotary member 103. When a target frequency of 10 Hz is set for the rotation signal 105, the display means 106 comprising needles in linkage with the power transmitting means 102 upon attainment of 10 Hz by the rotation signal 105 accurately displays the time of the day.

A rotary member 103 and braking means 104 of any type may be used. The term "braking" as herein used include a negative braking action, i.e., and accelerating action. In this embodiment, the rotary member 103 is a rotor 12 of the generator 20, and the braking means 104 is a variable resistor and a switch connected to the output of the generator 20. As this switch, a transistor or the like applicable as a switching element such as an FET may be adopted, and one which applies braking by causing a short circuit of the output terminal of the generator 20 is applicable. Acceleration is possible by supplying current to the output of the generator 20. The braking means 104 may be a brake which reduces the speed by applying a frictional force to the rotary member 103, and it suffices to appropriately select a brake in response to the kind of the rotary member 103.

The configuration of the control system controlling this electronically controlled mechanical watch will now be described with reference to the block diagram of the control system of the invention shown in FIG. 5. The control circuit is provided with a mechanical member 111 comprising a generator 20 and the like, target signal generating means 112 or target signal generator, frequency difference compensating means 114 or frequency difference compensator, phase difference compensating means 118 or phase difference compensator, and braking signal generating means 116 or braking signal generator.

The mechanical member 111 outputs a rotation signal 105 comprising a pulse waveform. The target signal generating means 112 similarly outputs a target signal 113 of a pulse waveform. The target signal 113 has a frequency of, for example, 10 Hz. These rotation signal 105 and target signal 113 are entered into the frequency difference compensating means 114 and the phase difference compensating means 118, respectively.

In the frequency difference compensating means 114, a frequency difference compensating signal 115 is generated from the difference is frequency between the target signal 113 and the rotation signal 105. The frequency difference compensating signal 115 is set in a direction of braking if the rotation signal 105 is faster than 10 Hz of the target signal 113, and in a direction of releasing the brake if slower than 10 Hz. This enables the rotary member 103 to rotate at revolutions near the target revolutions.

The phase difference compensating means 118 generates a phase difference compensating signal 119 on the basis of a phase difference between the target signal 113 and the rotation signal 105, i.e., for example, on the basis of a time difference in fall between these signals 113 and 105. The phase difference compensating signal 119 is directed toward releasing the brake, if, for example a fall of the target signal 113 appears before a fall of the rotation signal 105, deeming that the rotation signal 105 is behind.

The braking signal generating means 116 generates a braking signal 117 from the frequency difference compensating signal 115 and the phase difference compensating signal 119, and controls rotation of the rotary member 103 of the mechanical member 111 by means of this signal 117. Setting of an appropriate constant for the control loop causes the rotary member 103 to rotate in synchronization with the target signal 113, thus permitting display of an accurate time of the day by display means 106 such as needle.

FIG. 6 is a more detailed configuration diagram of the control circuit shown in FIG. 5. The control circuit of this embodiment will now be described further in detail with reference to FIG. 6.

The target signal generating means 112 is composed of a crystal oscillator 121 and a frequency divider 122: an output of the crystal oscillator 121 is divided by the frequency divider 122 to generate the target signal 113.

The frequency difference compensating means 114 comprises a frequency difference detecting circuit 123, a frequency difference compensating filter 124 and a retaining circuit 125.

The frequency difference detecting circuit 123 calculates a frequency difference between the target signal 113 and the rotation signal 105 by counting clocks not shown. The frequency difference compensating filter 124 suffices to have a configuration giving integral, proportional and differential functions and making the control loop stable. In this embodiment, the. filter is composed of only an apparatus performing the simplest gain adjustment.

The retaining circuit 125 has a configuration which permits selection as to whether an output 132 of the frequency difference compensating filter 124 is passed as it is, or the value of the compensating filter output 132 at a designated time is retained, in response to a switching signal 129. This retaining circuit 125 forms the frequency difference compensating retaining means.

The phase difference compensating means 118 will now be described. The phase difference compensating means 118 comprises a phase difference detecting circuit 126 and the phase difference compensating filter 127.

The phase difference detecting circuit 126 has a configuration permitting detection of a phase difference between the target signal 113 and the rotation signal 105. This phase difference is connected into the phase difference compensating signal 119 through the phase difference compensating filter 127 serving as compensating signal generating means.

The phase difference compensating filter 127 contains an integrating element which integrates and outputs an error signal to eliminate a constant phase error. The response time constant of the mechanical member 111 to the braking signal 117 is as large as about one second under the effect of inertia of the rotary member 103 and the power transmitting means 102. The time constant for the phase difference compensating filter 127 is therefore set to at least about 10 seconds from the stabilization conditions.

A switching signal 129 serving as a control signal is entered into the phase difference compensating filter 127. The switching signal 129 is used for switching over the filter operation between operating and stoppage states, and switching over an output of the phase difference compensating signal 119 between outputting and not outputting from the filter.

On the other hand, the braking signal generating means 116 is provided with an adder 130 and a braking pulse generating circuit 131.

The adder 130 adds the frequency difference compensating signal 115 output form the frequency difference compensating means 114 and the phase difference compensating signal 119 output from the phase difference compensating means 118. An output of the adder 130 enters the braking pulse generating circuit 131, and the braking pulse generating circuit 131 generates the braking signal 117. The mechanical member 111 is brake-controlled by this braking signal 117.

By using the control method as described above, the rotary member 103 rotates in phase-synchronization with the target signal 113. The crystal oscillator 121 rotates as a result more accurately, thus permitting accurate display of the time of the day on the display means 106.

FIG. 7 is a detailed configuration diagram of the frequency difference detecting circuit 123. The frequency difference detecting circuit 123 has a first counter 141, a second counter 142, and a subtracter 146. To measure the frequency of the target signal 113, the first counter 141 is cleared upon a fall of the target signal 113 and counts clocks 143 entered into the frequency difference detecting circuit 123 until the next fall. An output 144 of the first counter 141 is the value retained upon a fall of the target signal 113 which is output until the next fall.

Similarly, the second counter 142 sums up, as in the first counter 141, clocks 143 of the frequency difference detecting circuit 123 from a fall to the next one of the rotation signal 105, and a value retained upon fall of the rotation signal 105 becomes an output 145. The result of subtraction of the output 145 of the second counter 142 from the output 144 of the first counter 141 is calculated in the subtracter 146 to become a frequency difference signal 147. When the clock 143 entered into the frequency difference detecting circuit 123 is assumed to be 1,000 Hz, for example, the target signal 113, to be 10 Hz, and the rotation signal 105, 15 Hz, the frequency difference signal 147 takes a count value of about 33. The above description has used a fall of the target signal 113 or the rotation signal 105, whereas a rise may of course be employed.

FIG. 8 is a descriptive view of functions of the frequency difference compensating means 114. The roles played by the frequency difference compensating means 114 will now be described with reference to FIG. 8. Without the frequency difference compensating means 114, the control loop would comprise only the phase difference compensating means 118. Because the mechanical member 111 has a time constant of about a second as described above, stabilization cannot be achieved unless the loop system time constant dependent upon the time constant of the phase difference compensating filter 127 is at least about ten seconds. In this case, the integral element of the phase difference compensating filter 127 is a determining factor of an average value of the braking signal 117. It takes however a period of time of about ten seconds from the start of control up to a constant state of the integral value of integral elements. During this response period, rotation of the rotary member 103 changes revolutions from a high-speed rotation slowly to revolutions in synchronization with the target signal 113. As viewed from a user of the watch, it takes for the second needle of the watch a period of time of at least ten seconds until stabilization of the second needle, and the user feels anxiety. Under the effect of the frequency difference compensating means 114, this response period can be reduced to about a second which is the response period of the mechanical member 111. This is due to the fact that the stability is available even with a very large loop gain of the frequency difference control loop.

FIG. 8, the switching signal 129 is illustrated by further dividing it into four signals: i.e., a control start signal 54, a frequency control validity signal 53, a sample signal 52, and a phase difference control validity signal 51. At the startup time 60, the power is turned on, the crystal oscillator 121 and the like are started, and a little later, the target signal is stabilized at the target frequency 57. Subsequently, at the control start time 61, the frequency control validity signal 53 becomes "1", and the frequency difference compensating means 114 enters into operation. At this point, the phase difference compensating means 118 is not as yet in operation. During a transient response time 59, the rotation signal frequency 56 becomes almost constant at the constant value. The transient response time 59 can be reduced within about a second. At the switching time 62 after the transient response time 59, the frequency difference compensating signal 115 is held at the current value by means of the sample signal 52. Further at the switching time 62, the phase difference control loop is closed by the phase difference control validity signal 51. At the switching time 62, the frequency difference compensating signal has brought the rotation signal closest substantially to the target frequency, so that the response of the phase difference control loop to be closed at the switching time 62 comes to an end in a short period of time. The retained frequency difference compensating signal 115 corresponding to a braking force sufficient to reduce the revolutions of the rotary member 103 tending to rotate at a high speed under the action of the force generated by the power source 101 to revolutions in synchronization with the frequency of the target signal 113. When then is a change in the force generated by the power source 101, therefore, the retained value of the frequency difference compensating signal 115 becomes an inappropriate value. For example, when the power source 101 is a spiral spring, gradual release of the spiral spring leads to a smaller generated force. The value of the frequency difference compensating signal 115 retained in a state in which the spiral spring is wound to the full at the start of control becomes excessively large. For the purpose of setting again an appropriate value of the frequency difference compensating signal 115, control can be switched over to frequency control at the time 63.

At the switching time 62, the frequency difference compensating means 114 is switched over to the phase difference compensating means 118 because application of control with the both means leads to mutual interference of the both means, which tends to result instable control loop, and this makes it difficult to accomplish a detailed design.

The retained value of frequency difference compensating signal 115 corresponds to an approximate braking force, and is not therefore required to be a strictly accurate value. A switching time 62 may therefore be set by any of the following methods.

The first method is to monitor the frequency difference signal 147, and when it comes within a certain predetermined range of absolute value, conduct switching. The second method is to perform switching upon the lapse of a certain period of time determined from the design value of response time of the frequency control loop.

The former method is advantageous in that switching is possible at an appropriate timing even with dispersions of properties of the mechanical member 111. The latter method, which is operable with a timer, has an advantage of a simpler circuit configuration.

FIG. 9 is a configuration diagram of the phase difference detecting circuit 126. In the conventional phase difference detecting circuit popularly used, a linear detecting signal is available only for a phase difference within a signal period. In the phase difference detecting circuit 126 of this embodiment, in contrast, a linear detecting signal is available even for a difference of over a signal period.

More specifically, the phase difference detecting circuit 126 comprises a fall detecting circuit 171, another fall detecting circuit 172, and an up/down counter 173. While the phase difference detecting circuit 126 of this embodiment gives a phase difference signal 174 by the use of a fall of the target signal 113 and the rotation signal 105, riseup may be employed.

In the phase difference detecting circuit 126, a fall of the target signal 113 is detected by the fall detecting circuit 171 and converts it into an up-signal 175. Similarly, a down-signal 176 is obtained by detecting a fall of the rotation signal 105 by the fall detecting circuit 172. The up-signal 175 and the down-signal 176 are entered into the up/down counter 173 to determine the difference in counts between the up-signal 175 and the down-signal 176, and the result is used as the phase difference signal 174. This corresponds to determination of a difference in the member of pulses between the target signal 113 and the rotation signal 105 from the time point of start of counting.

FIG. 10(A) illustrates a waveform diagram of the phase difference detecting circuit 126. The phase difference signal waveform 83 increases by one for each fall of the target signal waveform 81, and decreases by one for each fall of the rotation signal waveform 82. In the drawing, the phase difference signal is defined as an extent of forwarding of the target signal 113 relative to the rotation signal 105. In the left-side half of FIG. 10(A), therefore, the long period of the rotation signal waveform 82 leads to movement of the phase difference signal 83 in the positive direction. In the right-side half of FIG. 10(A), the rotation signal waveform 83 has the same period as the target signal waveform 81. As a result, the phase difference signal waveform generates a short pulse representing the phase difference between the both signals, having a slightly positive value on the average without fluctuations. When the phase of a signal period is counter as one, the phase difference signal waveform 83 has a waveform formed by expressing a phase difference of more than one with the waveform level, and synthesizing phase differences smaller than one with pulse-width-modulated waveforms.

In FIG. 10(B), the phase 85 of the target signal, the phase 84 of the rotation signal, and the phase difference 86 are illustrated at positions corresponding to the graph shown thereabove. By passing the phase difference signal waveform 83 through a low-region passing filter, it is known that the changes are the same as those of the phase difference 86.

By the use of such a phase difference detecting circuit 126, a phase difference is retained even when a disturbance acts on the mechanical member 111 and the phase difference becomes temporarily larger than a period, thus adjusting braking so that the phase difference is gradually reduced. A cumulative display shift of the watch is therefore never caused. Conceivable disturbances acting on the mechanical member 111 include the acceleration caused by a movement of the arm in application of the invention to a wristwatch. The phase difference detecting circuit 126, being composed of a counter, has a simple circuit configuration and permits achievement with a compact circuit.

FIG. 11 is a configuration diagram of a phase difference compensating filter 127. This compensating filter 127 is based on a type of control known as PI control comprising integration and proportion. A phase difference signal 191 is multiplied by an appropriate constant from constant setting circuit 227 by a multiplier 192 to become a control signal 199 of a proportional portion. The phase difference signal 191 becomes a control signal 200 of an integral portion by the integrating element 203. The control signal 199 of the proportional portion and the control signal 200 of the integral portion are summed up by an adder 201 into an output of a phase difference compensating signal 119.

The integrating element 203 comprises a frequency divider 195 which divides a clock 194 of the phase difference compensating filter 127, a sign determining circuit 193 which determines the sign of the phase difference signal, and an up/down counter 197 which switches between up and down with a sign 198, and counts frequency-divided clocks 196. The frequency divider 195 has a configuration in which the dividing ratio is variable with the absolute value of the phase difference signal 191: if the frequency of the clock 196 divided with an absolute value of "1" is f1, the frequency of the clock 196 divided with an absolute value of "2" is divided so as to become twice as large as f1. The integration gain can be adjusted by means of this f1. The multiplier 192 is a factor for determining a proportional gain of the compensating filter. Operation of the multiplier 192 may be accomplished by an actual multiplication, or by a shift. By using the configuration of the phase difference compensating filter 127 as described above, it is achievable with a small circuit scale.

FIG. 12 is an operational waveform diagram of the phase difference compensating filter 127. A phase difference signal waveform 211 changes its direction form "minus 2 (−2)" gradually into a positive direction, becomes temporarily "plus 1 (+1)", and then changes again into "minus 1". A sign waveform 213 becomes "1" (high level) when the phase difference signal waveform 211 is positive. A frequency-divided clock waveform 214 divides a clock 212 into two when the phase difference signal waveform 211 has an absolute value of "2", and into four when the absolute value is "1". This dividing ratio, being set to schematically express a waveform, is different from an actual dividing ratio. An actual dividing ratio van be determined, for example, by considering achievement of an appropriate integration gain. A control signal waveform 215 of the integral portion is available by counting the divided clocks 214 in compliance with the sign waveform 213. This takes a waveform obtained by integrating the phase difference signal waveform 211.

A larger absolute value of the phase difference waveform 211 results in a smaller dividing ratio. In the case shown in FIG. 12, an absolute value of "3" corresponds to a dividing ratio of 1. For an absolute value larger than "4", it suffices to adopt a dividing ratio of 1. This operation corresponds to clipping an integration gain relative to an error signal. Even when assuming an external force causing a change in revolutions of 30% of the rotary member as a disturbance, the absolute value of the phase difference signal 191 in about "4" to "5", clipping poses no problem in control property.

Operations in this embodiment will now be described with reference also to the flowcharts shown in FIGS. 13 to 18.

For example, when a watch is started such as winding a spiral spring of an electronically controlled mechanical watch in stoppage, the control switching flow is first brought into operation (Step 1; hereinafter the word "step" is abbreviated as "S").

The control switching flow is to set a timing of switching control from brake control by the aforementioned frequency difference compensating means 114 to brake control by the phase difference compensating means 118. More specifically, there is set any of a flow of outputting a switching signal upon the lapse of a certain predetermined period of time as shown in FIG. 14, and a flow of outputting a switching signal upon attaining a frequency range set by the frequency difference compensating signal 115 of the frequency difference compensating means 114 as shown in FIG. 15.

In the flow shown in FIG. 14, the switching signal is first cancelled (initialization) upon starting (S11), and data retaining at the retaining circuit 125 is also cancelled (S12). Then, the counter is started to count time measuring pulses (S13), and whether or not the counter value has reached a set value (S14). Upon reaching the set value, the switching signal is output from the stage switching circuit 128 (S15).

Although not shown in this flowchart, when a value under "0", i.e., a "−" value occurs as a result of subtraction of the frequency control, the f-value (frequency difference compensating signal 115) becomes 0, and the setting is to output the FB signal (reset signal). The FB signal causes resetting of the time measuring counter value, and counting from 0 is started again. This prevents the f-value from becoming 0 when the switching signal is output.

In the flow shown in FIG. 15, on the other hand, the switching signal is first cancelled (initialization) upon starting (S21), and data retaining at the retaining circuit 125 is also cancelled (S22). Then, the output f-value (frequency difference compensating signal 115) from the frequency control flow described later is incorporated (S23), and it is determined whether or not the f-value is within a set frequency range (S24). If it is within the set range, the stage switching circuit 128 outputs the switching signal (S25).

Until the switching signal is entered from the stage switching circuit 128, as shown in FIG. 13, frequency control is carried out by the frequency difference compensating means 114 (S2).

Frequency control by the frequency difference compensating means 114 comprises, as shown in FIG. 16, measuring by counting the period of Ref1-pulse (target signal 113) and the period of G-pulses (rotation signal 105) by the use of prescribed frequency gain pulses Cf (S31).

The thus measured values (Ref1-value and G-value) are entered into a subtracter 146 to calculate an f-value through a subtraction "f=Ref1-value−G-value" (S32). It is then determined whether or not the f-value is at least 0 (S33). When the f-value is under 0, i.e., when the result of calculation at the subtracter 146 is "minus", the case is marked "f-value=0" (S34). The resultant f-value is output as a frequency difference compensating signal 115 (S35).

As a result, brake control is applied by the f-value (frequency difference compensating signal 115) until the switching signal is entered.

The period of the Ref1-pulses and the period of G-pulses are measured through steps as shown in FIGS. 17 and 18.

More specifically, for the Ref1-pulses, a first counter 141 is first reset (S36), and the duration of the period of Ref1-pulses is measured by counting with frequency gain pulses Cf (S37). It is then determined whether or not measurement of the Ref1-pulse period has come to an end by means of input of the frequency gain pulses Cf (S38). If the measurement has come to an end, the count value is output to a register or the like as the Ref1-pulse (S39), and measurement of the duration of the next Ref1-pulse period is repeated.

Similarly, the duration of G-pulse period is measured by first resetting the second counter 142 (S40) and counting with frequency gain pulses Cf (S41). Then, it is determined whether or not measurement of the G-pulse period has come to an end (S42). If it has, the resultant count value is output as G-pulse to a register or the like (S43). Then, measurement of the next G-pulse period is repeated.

These count values (Ref1-value and G-value) 144 and 145 stored in the register serve as the measured value in S31 of the flow shown in FIG. 16.

During frequency control, if the switching signal is entered as shown in FIG. 13 (S3), the f-value (frequency difference compensating signal 115) at this point is read in by the retaining circuit 125 and retained therein (S4). Subsequently, therefore, the f-value is fixed to the value at the point of input of the switching signal of frequency control.

Brake control based on PLL control is carried out by means of a signal resulting from addition of this fixed f-value and the output from the phase difference compensating means 118 in an adder 130 (S5).

In the phase difference compensating means 118, the braking signal is calculated through steps as shown in FIG. 19. First, phase difference signals are counted by the phase difference detecting circuit 126 from startup until the aforementioned switching signal is entered, i.e., during the period in which brake control is performed by the frequency difference compensating means 114 (S51). More specifically, phase difference signals are counted with an up/down counter 173 which is turned up by the input of the target signal 113 and turned down by the input of the rotation signal 105.

Upon input of the switching signal (S52), a P-value (control signal 199) and an I-value (control signal 200) are calculated by the phase difference compensating filter 127 (S53).

The P-value is calculated through a proportional gain multiplication (shifting), by a multiplier 192, of a phase deviation e of the phase difference signal counted by the up/down counter 173.

The I-value is calculated, on the other hand, through steps of the flow shown in FIG. 20. That is, selection of an integration gain is first performed by means of the phase deviation e (S61). Specifically, as shown in FIG. 21, the phase deviation e is entered into the frequency divider 195 (S71). If the phase deviation e is under 1 (S72), the phase deviation e is determined as being 0, and 0 Hz is selected as the integration gain pulse (S73). If the phase deviation e is not under 1 (72), it is determined whether or not the phase deviation e is 1 (S74), and if it is 1, Ci1 Hz is selected as the integration gain pulse (S75).

If the phase deviation e is not 1, it is determined whether or not it is under 3 (S76): if it is under 3, the phase deviation e is determined to be 2, and Ci2 Hz is selected as the integration gain pulse (S77).

Further, if the phase deviation e is not under 3, it is determined whether or not it is 3 (S78), and if it is 3, Ci3 Hz is selected as the integration gain pulse (S79). If the phase deviation e is not 3, then, Ci4 Hz is selected as the integration gain pulse (S80).

The next step is to output the selected integration gain pulse (0 Ci1, Ci2, Ci3 and Ci4) (S81).

Then, as shown in FIG. 20, it is determined whether the G-pulse is fact or slow by means of a sign determining circuit 193 (S62). If fact, the amount of gain is measured with the selected integration gain pulse, and the up/down counter 197 is up-counted with the resultant measured value (S63). If slow, the amount of loss is measured with the selected integration gain pulses, and the up/down counter 197 is down-counted with the resultant measured value (S64).

This count value of the up/down counter 197 is output as the I-value (control signal 200) (S65).

After calculation of the P-value and the I-value, a forward deviation of G-pulse is determined (S54). If the G-pulse is in forward deviation, the result of calculation of "H-value= I-value+P-value" in the adder 201 (H-value: phase difference compensating signal 119) is output to the adder 130 (S55). For a backward deviation, on the other hand, the result calculation of "H-value=I-value−P-value" is output to the adder 130 (S56).

The H-value (phase difference compensating signal 119) resulting from the calculation and the f-value (frequency difference compensating signal 115) retained in the retaining circuit 125 are summed up by the adder 130 to calculate a braking signal (N-value) (S57) for brake control. In this embodiment, chopping control is applied by the use of a prescribed pulse (Ref2-pulse) during brake control based on frequency control and PLL control (S58).

The present embodiment provides the following advantages:

(1) Provision of the phase difference compensating means 118 permits control of rotation of the rotary member 103 by PLL control. As a result, for example, a braking level can be set by comparing waveforms of the rotation signals 105 for the individual periods of the rotary member 103. By once holding it within the locking range, it is possible to ensure a stable control with a high response unless the signal waveform largely varies instantaneously, and further, to eliminate a phase deviation. The rotary member can therefore be rotated accuracy in synchronization with the target signal 113. In addition, the speed of the rotary member 103 does not may largely, so that it is possible to minimize the energy loss caused by braking, and achieve a longer service life, permitting long-time rotation of the rotary member 103.

By applying this embodiment to an electronically controlled mechanical watch, therefore, it is possible to achieve a time display at a very high accuracy, and to provide a watch having a long service life.

(2) The frequency difference compensating means 114 is provided in addition to the phase difference compensating means 118. When the control comes off the locking range in PLL control such as immediately after start of rotation control of the rotary member 103, control can be carried out by the use of the frequency difference compensating means 114 in such a manner as to bring the speed difference closer to 0 by disregarding the phase difference between the rotation signal 105 and the target signal 113, and the rotary member 103 can be quickly brought within the locking range. After bringing the speed difference closer to 0 with the frequency difference compensating means 114, rotation control is effected with the phase difference compensating means 118. As compared with control by the use of the phase difference compensating means 118 alone, therefore, it is possible to prevent a large phase deviation from being accumulated, and conduct quickly the speed adjusting control of the rotary member 103. In this embodiment, more specifically, rotation control is applied by means of the frequency difference compensating signal 115 based on the frequency difference compensating means 114 during the control starting stage. Even when the revolutions of the rotary member 103 largely deviate from the target revolutions, therefore, it is possible to quickly bring the revolutions closer to the target revolutions, and to conduct a rotation control of a good response.

As a result, when applying the present embodiment to an electronically controlled mechanical watch, and even when operation is started after stoppage of the generator for needle alignment, operation can be quickly transferred to normal needle operation.

(3) During the constant control stage, furthermore, rotation control is performed by the use of a sum signal of the frequency difference compensating signal 115 and the phase difference compensating signal 119. It is therefore possible to set an approximate braking amount from the frequency difference compensating signal 115. It suffice, with the phase difference compensating signal 119, to set a braking amount sufficient to conduct fine control which cannot be achieved with the frequency difference compensating signal 115. By summing up the signals, it is possible to quickly determine an optimum amount of control, thus permitting further improvement of response of rotation control.

(4) In addition, it suffices for the frequency difference compensating signal 115 to be capable of calculating an approximate amount of braking. This permits simplification of the configuration of the frequency difference compensating means 114.

(5) Because braking control is achieved by the utilization of chopping, the braking torque can be increased while keeping a generated power on a level higher than a certain level. It is therefore possible to conduct an efficient braking control while maintaining stability of the system.

(6) When determining stabilization of rotation control from the frequency difference during the control starting stage, the stage switching circuit 128 can certainly and relatively easily determine stabilization of rotation control, permitting appropriate switching the control without dispersions of the rotary member 103.

(7) When the stage switching circuit 128 deems the rotation control to have been stabilized upon the lapse of a certain predetermined period of time from the start of control during the control starting stage and switches over the control from the control starting stage to the constant control stage, a timer is applicable. As compared with the case of determining stabilization from the frequency difference, therefore, the circuit configuration can be made simpler.

(8) Since the frequency difference detecting circuit 123 and the phase difference detecting circuit 126 comprise counters 141, 142, and 173, it is possible to form a simple circuit configuration, easily downsize the circuit, easily apply the embodiment to a small device such as a wristwatch, and reduce the cost.

Further, because the counters 141, 142 and 173 capable of retaining a plurality of counter values, it is possible to detect a phase difference or the like within a wide range, and retain cumulative value even when phase differences are cumulated, thus permitting control in response to the cumulative phase differences and a more accurate speed adjusting control.

(9) In the phase difference compensating film 127 of the phase difference compensating means 118, the dividing ratio of the frequency divider 195 is made variable with the absolute value of the phase difference signal 191 to permit selection of an integration gain pulse. It is therefore possible to select an appropriate magnitude of the phase difference compensating signal 119 in response to the magnitude of the phase difference, and thus to perform control so as to quickly eliminate the phase difference.

The present invention is not limited to this embodiment, but variants and modifications within the range permitting achievement of the objects of the invention are within the scope of present invention.

For example, in the aforementioned embodiment, the P-value and the I-value of the phase difference compensating means 118 are added or subtracted, and then the result is added to the f-value (frequency difference compensating signal 115) of the frequency difference compensating means 114. As shown in FIGS. 22 and 23, however, this process may comprise the steps of summing up the output of the frequency difference compensating means 114 (frequency difference compensating signal 115) and the output I-value of the phase difference compensating means 118 (integration counter output 200) by the adder 501, and then adding or subtracting the P-value of the phase difference compensating means 118 (proportional gain output 199) in response to loss or gain (sign) of the amount of phase deviation by an adder 502.

FIG. 22 is a configuration diagram illustrating a case in which the stage switching circuit (control switching circuit) 128 switches over switches 503 and 504 in a certain period of time; and FIG. 23 is a configuration diagram illustrating a case where the stage switching circuit (control switching circuit) 128 switches over the switches 503 and 504 in response to the output of the frequency difference control circuit (frequency difference). In the control starting stage, the output of the frequency difference compensating means 114 (frequency difference compensating signal 115) is output as it is to the adder 501 by the switch 503, because the switch 504 is not connected to a phase deviation absolute value detector 505, and the rotary member 103 is speed-adjustment-controlled by the frequency difference compensating signal 115 via a PWM (pulse width modulation) converter 506.

On the other hand, when the control starting stage is switched over to the constant control stage by the stage switching circuit (control switching circuit ) 128, the switch 503 is connected to the retaining circuit (register) 125 retaining the frequency difference compensating signal 115 upon switching, and this value is output later. The switch 504 is connected to the phase comparison deviation counter 173. The output 200 of the up/down counter (integration counter) 197 corresponding to the phase deviation amount e detected by the phase deviation absolute value detector 505, and the output 199 of the multiplier (proportional gain) 192 are entered into the adder 501 and the adder/subtracter 502. The adder 501 sums up the frequency difference compensating signal 115 and the output 200, and the adder/subtracter 502 adds or subtracts the output 199 in response to the sign of the phase deviation amount e. When an output of this adder/subtracter 502 is negative, the switch 507 is switched over from the output of the adder/subtracter to the output 0. The rotary member 103 is speed-adjustment-controlled by the output of the adder/subtracter 502 via the PWM converter 506.

The present invention is not limited to application to an electronically controlled mechanical watch, but may also be applied to an automatic generator type one based on generation by the use of a rotary weight or a general quartz watch incorporating a battery.

Further, the present invention is applicable to various toys operating by spring power. As shown in FIG. 24, for example, a toy comprises a spiral spring 301; a winding mechanism 302 winding this spiral spring; a transmitting mechanism 303 transmitting mechanical energy of the spiral spring 301; an operating member 304 connected to this transmitting mechanism 303 and operating by the mechanical energy; a rotary member 305 connected to the transmitting mechanism 303 or to the operating member 304 and rotating by the mechanical energy; and a rotation controller of the invention, adjusting the revolutions of the rotary member 305.

As an example of such toys, there is available opening/closing toy in which closing a compact causes winding of a spiral spring 301, and opening thereof releases the spiral spring 301, thereby causing a doll or an animal doll in the compact to move. In the opening/closing toy, a winding mechanism 302 comprises a compact opening/closing mechanism which permits speed adjusting control of movement of the doll.

Another example of such toys is a car-type running toy driven by a spiral spring. In this toy, the spiral spring 301 is wound manually or by a pull-back mechanism (winding the spiral spring by causing the toy to run backward while pressing the tires against the floor), and the toy is caused to run by rotating the tires by the energy of the spiral spring 301. The running speed can be accurately adjusted by providing a rotation controller 306, and can be made variable by making the target signal variable by a switch or the like.

Still another example of such toys is a running member guiding game board in which a running member traveling on a game board is guided. In this toy also, it is possible to accurately adjust the running speed of the running member, thus permitting running in a certain period of time without the need to use a separate timer.

Further, by applying the present invention to a walking doll or animal-type toy through operation of a walking mechanism serving as an operating member 304 with a spiral spring 301, it is possible to adjust the walking speed and extend the walking time.

By the application of the invention to a toy generating an imitation sound through operation of an imitation sound generating unit serving as an operating member 304 with a spiral spring 301, the imitation sound generating unit can be driven at a certain speed and ensure output of a stable sound.

When applying the invention to a toy rotation-displaying a greeting card or the like bearing a message through a card rotating mechanism serving as an operating member 304 with a spiral spring 301, it is possible to rotate the greeting card at a certain speed for a long period of time.

If the invention is applied to a portable game toy in which pulling a cord serving as a winding mechanism 302 to wind a spiral spring 301, and then releasing the cord releases the spiral spring 301 which is coiled onto a drum, and this action causes a doll or the like to rotate, it is possible to accurately set a winding time of the cord onto the drum, i.e., the operating time of the doll or the like.

Application of the invention to a talking game toy, producing a sound by rotating an audio disk by a spiral spring 301 permits stable rotation of the disk at a prescribed speed, thereby stabilizing voice and actions.

The present invention is applicable also to an auto-cruising mechanism of a hybrid car. A hybrid car is based on a process comprising the steps of generating power by transmitting engine 401 output via power transmitting means (clutch) 402 to a generator 403, charging battery means (battery) 404, and driving the generator 403 with the power from the battery means (battery) 404 upon starting, low-speed running, or accelerating to cause the generator to serve as a motor, thereby driving wheels. Power is generated with a regenerative brake which is an application of an electromagnetic brake of the generator 403 during braking. In such a hybrid car, the generator 403 is speed-adjustment-controlled by the utilization of the rotation controller of the invention. In this case, the speed of an auto-cruising mechanism running at a constant speed is not controlled by power on the engine side, but through speed-adjustment control by the use of the control circuit 405 and a brake control circuit 406 so as to ensure synchronization of the rotation speed of the generator 403 with the target frequency 410.

When charging is carried out by rotating the generator 403 with the engine 401, and if voltage produced in the generator 403 by a set speed of auto-cruising is low relative to the potential of the battery member 404, it may be impossible to charge, or a lower charging efficiency results.

When charging auto-cruising through speed adjustment of the generator 403, in contrast, it is possible to increase the starting voltage under the effect of voltage increase by chopping (always in regenerative braking) while obtaining a braking force by applying braking control by chopping, and to prevent a decrease in charging efficiency while conducting speed-adjusting control. The voltage-increasing charging level may be adjusted by means of the input energy of the engine 401.

The rotation controller of the invention can be provided, not only on a hybrid car, but also in a vehicle having a regenerative retarder (generator) capable of collecting energy of motion resulting from speed reduction upon braking as electric energy.

The present invention is applicable, not limited to a watch, a toy and an automobile, but wide to products requiring speed-adjustment control of a rotary member.

According to the present invention, as described above, a rotation controller controlling revolutions by braking a rotary member rotating by power supplied from a power source is achieved by providing the phase difference compensating means and the frequency difference compensating means, thus making it possible to cause rotation of the rotary member in synchronization with the target signal, and to achieve a stable rotation control with a high response.

The frequency difference compensating means has frequency difference compensation retaining means, and the braking control means is provided with two control modes including a control starting stage immediately after start of rotation control and a constant control stage with a stable rotation control. In the control starting stage, rotation control is based on the frequency difference compensating signal of the frequency difference compensating means, and in the constant control stage, braking control is carried out on the basis of a sum signal of the frequency difference compensating signal retained by the frequency difference compensation retaining means upon switching from the control starting stage to the constant control stage. Through such control, the revolutions can be quickly brought closer to the target revolutions even when the revolutions of the rotary member largely deviate from the target revolutions, and a highly responsive rotation control can be achieved.

When stabilization of rotation control is determined from a frequency difference during the control starting stage, it is possible to appropriately switch over control, not depending upon dispersions of the rotary member.

During the control starting stage, by deeming the control to have been stabilized upon the lapse of a certain predetermined period of time from the start of control and switching over control from the control starting stage to the constant control stage, it is possible to switch over with a simple circuit configuration.

In the phase difference compensating means and the frequency difference compensating means, use of counters for detecting a phase difference or a frequency difference makes it possible to achieve a simpler circuit configuration, easily downsize the device, and incorporate the controller easily in a compact device such as a wristwatch.

Industrial Applicability

The rotation controller and the rotation control method of the present invention, as described above, are useful for quickly speed-adjustment-controlling various rotary members at a high accuracy, and are particularly suitable for use as a rotation controller to be incorporated in a compact device such as an electronically controlled mechanical watch.

What is claimed is:

1. A rotation controller controlling the rotation period of a rotary member by applying one of a braking force and an acceleration force on the rotating rotary member by power supplied from a power source, comprising:

rotation detecting means for generating a rotation signal corresponding to revolutions of the rotary member;

target signal generating means for generating a target signal corresponding to target revolutions of the rotary member;

phase difference compensating means for detecting a phase difference between a rotation signal output by said rotation detecting means and a target signal output by said target signal generating means, and generating a phase difference compensating signal;

frequency difference compensating means for detecting a frequency difference between said rotation signal and said target signal, and for generating a frequency difference compensating signal;

a retaining means for selectively latching the current value of said generated frequency difference compensating signal and outputting the latched signal as a constant output reference signal; and brake/acceleration control means controlling one of the braking force and acceleration force in accordance with at least a starting control mode and a constant control mode, said retaining means being effective for latching the current value of said generated frequency difference compensating signal at a transition from said starting control mode to said constant control mode;

wherein said starting control mode is actuated immediately after a start of rotation control, and is effective for asserting rotation control in response to said generated frequency difference compensating signal while ignoring said generated phase difference compensating signal, and wherein said brake/acceleration control means transitions from said starting control mode to said constant control mode when rotation control is determined to be stable, said constant control mode being effective for asserting rotation control in response to a sum signal of said phase difference compensating signal and said constant output reference signal from said retaining means.

2. A rotation controller according to claim 1, further having a signal correction mode following said constant control mode and being effective for asserting rotation control in response to said generated frequency difference compensating signal;

said rotation controller sequentially alternating between said constant control mode and said signal correction mode, wherein said rotation controller is in said constant control mode for a first predetermined time period before alternating to said signal correction mode, and is in said signal correction mode for a second predetermined time period before alternating to said constant control mode;

said retaining means being further effective for latching the current value of said generated frequency difference compensating signal at a transition from said signal correction mode to said constant control mode.

3. A rotation controller according to claim 1, wherein in said starting control mode, said brake/acceleration control means determines that rotation control has been stabilized by an observed difference in frequency between said rotation signal and said target signal.

4. A rotation controller according to claim 1, wherein in said starting control mode, said brake/acceleration control means determines that the rotation control has been stabilized upon the lapse of a predetermined period of time from the start of control, and switches over control from said starting control mode to said constant control mode.

5. A rotation controller according to claim 1, wherein said phase difference compensating means comprises phase difference detecting means and compensating signal generating means for producing an output therefrom;

wherein said rotation signal and said target signal have a repeated pulse waveform; and wherein said phase difference detecting means comprises a counter which performs an addition or a subtraction at rises or falls of the target signal, and a subtraction or an addition at rises or falls of the rotation signal so as to sum up the number of rises or falls of each signal, and outputs an output of said counter as a phase difference signal.

6. A rotation controller according to claim 5, wherein said phase difference compensating means further comprises a phase difference compensating filter having an integrating function; and wherein said phase difference compensating filter comprises a sign detecting circuit detecting a sign of said phase difference signal, a frequency divider dividing a frequency with a dividing ratio variable depending upon the absolute value of the phase difference signal, and a counter adds or subtracts an output of the frequency divider with said sign.

7. An electrically controlled mechanical timepiece comprising:
- a mechanical energy source;
- a generator, driven by said mechanical energy source connected via a train wheel, generating an induced power and thus supplying electric energy;
- a rotation controller controlling the rotation period of said generator by applying one of a braking force and an acceleration force on said generator by power supplied from said mechanical energy source, comprising:
  - rotation detecting means for generating a rotation signal corresponding to revolutions of said generator;
  - target signal generating means for generating a target signal corresponding to target revolutions of said generator;
  - phase difference compensating means for detecting a phase difference between a rotation signal output by said rotation detecting means and said target signal output by said target signal generating means, and generating a phase difference compensating signal;
  - frequency difference compensating means for detecting a frequency difference between said rotation signal and said target signal, and generating a frequency difference compensating signal;
  - a signal capture circuit selectively triggered to capture and retain the current value of said frequency difference compensating signal output from said frequency difference compensating means, and to produce the captured signal as a reference frequency difference output signal and
  - brake/acceleration control means controlling one of the braking force and acceleration force in accordance with the frequency difference compensating signal from said frequency difference compensating means in a first mode of operation, and in accordance with the sum of said reference frequency difference output signal and said phase difference compensating signal during a second mode of operation, wherein said signal capture circuit is triggered in response to a transition from said first mode of operation to said second mode of operation; and
- a pointer connected to said train wheel.

8. A rotation control method for controlling the rotation period of a rotary member by one of braking and accelerating the rotary member rotated by power supplied by a power source, comprising the steps of:
- detecting a phase difference by comparing a rotation signal corresponding to revolutions of the rotary member and a target signal corresponding to target revolutions of the rotary member;
- producing a phase difference compensating signal corresponding to said phase difference
- detecting a frequency difference between said rotation signal and said target signal;
- producing a frequency difference compensating signal corresponding to said frequency difference;
- controlling one of braking and acceleration of said rotary member by means of said frequency difference compensating signal in a first mode of operation, and by means of a sum signal of said phase difference compensating signal and a constant frequency-difference reference signal during a second mode of operation.

9. A rotation control method according to claim 8,
wherein said first mode of operation is a control starting stage initiated immediately after start of rotation control; and
upon stabilization of rotation control, switching over to said second mode of operation defined as a constant control stage and sets said constant frequency-difference reference signal substantially equal to the value of said frequency difference compensating signal at this switching point.

10. A rotation control method according to claim 9, wherein:
stabilization determination of said rotation control in said control starting stage is based on a frequency difference between said rotation signal and said target signal.

11. (Twice Amended) A rotation control method according to claim 9, wherein:
in said control starting stage, rotation control is determined to have been stabilized upon the lapse of a predetermined period of time from the start of control, and control is switched over from said control starting stage to said constant control stage at the end of said predetermined period of time.

12. A rotation controller controlling the rotation period of a rotary member, comprising:
- a rotation detector to generate a rotation signal corresponding to revolutions of the rotary member;
- a target signal generator to generate a target signal corresponding to target revolutions of the rotary member;
- a phase difference compensator to detect a phase difference between said rotation signal and said target signal, and generating a phase difference compensating signal in response to the detected phase difference;
- a frequency difference compensator to detect a frequency difference between said rotation signal and said target signal, and generating a frequency difference compensating signal in response to the detected frequency difference;
- a signal-capture-circuit to selectively capture and hold the signal value of said frequency difference compensating signal in response to a transition from a first mode of operation to a second mode of operation, the captured signal being output as a constant-offset compensation signal;
- a brake/acceleration controller controlling one of the braking force and acceleration force in accordance with said frequency difference compensating signal during said first mode of operation and in accordance with a sum signal of said constant-offset compensation signal and said phase difference compensating signal during said second mode of operation.

13. A rotation controller according to claim 12,
wherein said first mode of operation is used during a control starting stage initiated immediately after a start of rotation control, and
wherein said second mode of operation is used during a control stage initiated when rotation control is stable; and
said rotation controller switches from said control starting stage to said control stage in response to the rotation control of said rotary member being determined to be stabilized.

14. A rotation controller according to claim 13,
wherein in said control starting stage, said brake/acceleration controller determines that rotation control has been stabilized when the difference in frequency of said rotation signal and said target signal is not greater than a predetermined value.

15. A rotation controller according to claim 13,
wherein said control starting stage, said brake/acceleration controller determines that rotation control has been stabilized upon the lapse of a first predetermined period of time from the start of rotation control, and switches from said control starting stage to said constant control stage at the end of said first predetermined period.

16. A rotation controller according to claim 12,
wherein said phase difference compensator includes a phase difference detector and a compensating signal generator for producing an output therefrom;
wherein said rotation signal and said target signal have a repeated pulse waveform; and
wherein said phase difference detector includes a counter which performs an addition or a subtraction at rises or falls of the target signal, and a subtraction or an addition at rises or falls of the rotation signal so as to sum up the number of rises or falls of each signal, and outputs an output of said counter as a phase difference signal.

17. A rotation controller according to claim 16,
wherein said phase difference compensator further includes a phase difference compensating filter having an integrating function; and
wherein said phase difference compensating filter includes:
 a) a sign detecting circuit detecting a sign of said phase difference signal,
 b) a frequency divider dividing a frequency with a dividing ratio variable depending upon the absolute value of the phase difference signal, and
 c) a counter that adds or subtracts an output of the frequency divider with said sign.

18. The rotation controller of claim 15, wherein said rotation controller switches from said second mode of operation back to said first mode of operation after being in said second mode of operation for a second predetermined period of time.

19. The rotation controller of claim 18, wherein said rotation controller initiated a third mode of operation after having been switched from said second mode of operation back to said first mode of operation, said third mode of operation including the sequence of consecutively alternating between being in said first mode of operation for a third predetermined period of time and being in said second mode of operation for said second predetermined period of time.

20. The rotation controller of claim 19 wherein said third period of time is less than said first predetermined period of time.

21. An electrically controlled mechanical timepiece comprising:
 a mechanical energy source;
 a generator, driven by said mechanical energy source connected via a train wheel, generating an induced power and thus supplying electric energy;
 a rotation controller controlling the rotation period of said generator by applying one of a braking force and an acceleration force on said generator by power supplied from said mechanical energy source, comprising:
  a rotation detector to generate a rotation signal corresponding to revolutions of said generator;
  a target signal generator to generate a target signal corresponding to target revolutions of said generator;
  a phase difference compensator to detect a phase difference between said rotation signal and said target signal, and generating a phase difference compensating signal;
  a frequency difference compensator to detect a frequency difference between said rotation signal and said target signal, and generating a frequency difference compensating signal; and
  a brake/acceleration controller controlling one of the braking force and acceleration force in accordance with said frequency difference compensating signal during a first mode of operation and a sum signal of said phase difference compensating signal and a constant-offset compensation signal during a second mode of operation; and
 a pointer connected to said train wheel.

22. The electrically controlled mechanical watch of claim 21 wherein said constant-offset compensation signal is substantially equal to the value of said frequency difference compensating signal at the point when said brake/acceleration controller switched from said first mode of operation to said second mode of operation.

* * * * *

UNITED STATES PATENT AND TRADEMARK OFFICE
CERTIFICATE OF CORRECTION

PATENT NO. : 6,477,116 B1
DATED : November 5, 2002
INVENTOR(S) : Osamu Shinkawa et al.

It is certified that error appears in the above-identified patent and that said Letters Patent is hereby corrected as shown below:

Column 23,
Line 46, after "the steps of:", insert:
-- providing a rotation detector for generating a rotation signal indicative of revolutions of the rotary member;
   providing a target signal generator for generating a target signal indicative of target revolutions of the rotary member; --
Line 47, after "comparing" delete "a", insert -- said --
Line 48, after "signal", delete "corresponding to revolutions of the rotary member", insert -- from said rotation detector --
Line 49, after "and", delete "a", and insert -- said -- before "target", and after "signal", delete "corresponding to target revolutions of the rotary member;" and insert "from said target signal generator, and"
Line 51, after "signal" delete "corresponding to said phase difference," and insert -- ; --
Line 54, after "target signal", delete ";" and insert -- , and --
Line 56, delete "corresponding to said frequency difference"

Column 24,
Line 12, delete "(Twice Amended)"

Signed and Sealed this

Second Day of March, 2004

JON W. DUDAS
*Acting Director of the United States Patent and Trademark Office*